United States Patent
Sera

(10) Patent No.: US 11,494,131 B2
(45) Date of Patent: Nov. 8, 2022

(54) PRINT SYSTEM, PRINT METHOD, INFORMATION PROCESSOR, AND NON-TRANSITORY COMPUTER-READABLE STORAGE MEDIUM STORING INFORMATION PROCESSING PROGRAM FOR DETERMINING GUIDANCE MESSAGES

(71) Applicant: SEIKO EPSON CORPORATION, Tokyo (JP)

(72) Inventor: Takashi Sera, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/227,672

(22) Filed: Apr. 12, 2021

(65) Prior Publication Data

US 2021/0318837 A1 Oct. 14, 2021

(30) Foreign Application Priority Data

Apr. 14, 2020 (JP) .............................. JP2020-072283

(51) Int. Cl.
  *G06F 3/12* (2006.01)
  *G06F 3/16* (2006.01)
  *G10L 15/22* (2006.01)

(52) U.S. Cl.
  CPC .......... *G06F 3/1203* (2013.01); *G06F 3/1273* (2013.01); *G06F 3/167* (2013.01); *G10L 15/22* (2013.01); *G10L 2015/223* (2013.01)

(58) Field of Classification Search
  CPC ...... G06F 3/1203; G06F 3/1273; G06F 3/167; G06F 3/1205; G06F 3/1253;
  (Continued)

(56) References Cited

U.S. PATENT DOCUMENTS

2015/0088016 A1* 3/2015 Fleischacker ........ G09B 23/288
    607/7
2018/0365025 A1 12/2018 Almecija et al.
(Continued)

FOREIGN PATENT DOCUMENTS

JP 2019-219740 12/2019

OTHER PUBLICATIONS

English Machine Translation of JP 2005-084589-A (Saito, Published Mar. 31, 2005) (Year: 2005).*

*Primary Examiner* — Juan M Guillermety
(74) *Attorney, Agent, or Firm* — Workman Nydegger

(57) ABSTRACT

A print system includes a print device and an information processor connected to the print device via a network. The information processor includes an information acquisition section that acquires, from a voice mediation device, information including a keyword included in a print instruction given by a user by voice, a guidance section that outputs, to the voice mediation device, a guidance message to be output by voice, a print data transmission section that generates print data using content based on the keyword acquired by the information acquisition section in response to an output of the guidance message and transmits the print data to the print device, and a proficiency determination section that determines proficiency indicating a level of proficiency of the user for the print instruction. Based on the proficiency, the guidance section generates the guidance message that is used for the acquisition of the keyword by the information acquisition section.

13 Claims, 12 Drawing Sheets

(58) Field of Classification Search
CPC ...... G06F 3/1285; G06F 9/453; G06F 3/1292; G10L 15/22; G10L 2015/223; G08C 2201/31; G05B 2219/23373; G03G 2215/00122; H03K 2217/94005; H04M 1/271; H04N 1/32784
See application file for complete search history.

(56) References Cited

U.S. PATENT DOCUMENTS

2019/0384570 A1   12/2019  Tomioka
2020/0264822 A1*  8/2020  Fujisawa ............... G06F 3/1273

\* cited by examiner

| USER ID | CATEGORY | CONTENT ID | DATE AND TIME OF PRINTING | |
|---|---|---|---|---|
| ... | ... | ... | ... | |
| UID1 | COLORING SHEET | 001 | 2020-3-10 08:10:10 | ← R1, R0 |
| UID1 | COLORING SHEET | 002 | 2020-3-18 08:10:20 | ← R1, R0 |
| UID1 | COLORING SHEET | 001 | 2020-3-23 08:20:10 | ← R1, R0 |
| UID1 | CALENDAR | 202003 | 2020-3-23 10:10:10 | ← R1, R0 |
| UID2 | CALENDAR | 202003 | 2020-3-23 15:10:10 | ← R0 |
| UID1 | COLORING SHEET | 002 | 2020-3-24 09:10:10 | ← R1, R0 |
| UID3 | NOTE | 101 | 2020-3-24 12:10:10 | ← R0 |
| UID2 | COLORING SHEET | 011 | 2020-3-24 13:10:30 | ← R0 |
| UID3 | CALENDAR | 202003 | 2020-3-24 14:30:10 | ← R0 |
| UID1 | COLORING SHEET | 001 | 2020-3-24 15:10:40 | ← R1, R0 |
| UID1 | NOTE | 101 | 2020-3-24 16:40:10 | ← R1, R0 |

↑ CA1

PRINT SYSTEM, PRINT METHOD, INFORMATION PROCESSOR, AND NON-TRANSITORY COMPUTER-READABLE STORAGE MEDIUM STORING INFORMATION PROCESSING PROGRAM FOR DETERMINING GUIDANCE MESSAGES

The present application is based on, and claims priority from JP Application Serial Number 2020-072283, filed Apr. 14, 2020, the disclosure of which is hereby incorporated by reference herein in its entirety.

BACKGROUND

1. Technical Field

The present disclosure relates to a print system including a print device and an information processor, a print method, an information processor, and a non-transitory computer-readable storage medium storing an information processing program.

2. Related Art

In recent years, printing is executed by a printer via a server computer that provides a cloud printing service.

In addition, smart speakers cooperating with voice recognition services on the cloud become available in the market over recent years.

JP-A-2019-219740 discloses a print system including a voice control device, a voice control device management server, a relay server, a multi-function device, a terminal device, and an access point. The relay server generates message data for messages to be output by voice from a speaker of the voice control device. One of the messages is a guidance message on next available operations for a user, such as a message telling "you can print puzzles, coloring sheets, . . . and checklists by a printer. What would you like to print out?", so that the user can select the type of printable content.

In the above print system, messages to be output by voice are predetermined by the message data and the same message is output by voice in the same situation. For example, whenever the print system asks the user which type of printable content the user wants to print out, the print system uses the same message "you can print puzzles, coloring sheets, . . . and checklists by the printer. What would you like to print out?". However, a user who knows printing operations very well may feel annoyed because the user needs to listen to the same message part way through before giving a voice instruction. Like this case, as a user knows more about operations of the print system, the user may feel annoyed to listen and response to a message depending on the content or length of the message.

SUMMARY

According to one aspect of the present disclosure, a print system includes a print device and an information processor connected to the print device via a network. The information processor includes an information acquisition section that acquires, from a voice mediation device, information including a keyword included in a print instruction given by a user by voice, a guidance section that transmits, to the voice mediation device, a guidance message to be output by voice, a print data transmission section that generates print data using content based on the keyword acquired by the information acquisition section in response to an output of the guidance message and transmits the print data to the print device, and a proficiency determination section that determines proficiency indicating a level of proficiency of the user for the print instruction. The guidance section generates, based on the proficiency, the guidance message that is used for the acquisition of the keyword by the information acquisition section. The print device receives the print data and executes printing according to the print data.

According to another aspect of the present disclosure, a print method uses a print device and an information processor connected to the print device via a network, and includes an information acquisition step of acquiring, in the information processor, information including a keyword included in a print instruction given by a user by voice from a voice mediation device, a guidance step of transmitting a guidance message to be output by voice, from the information processor to the voice mediation device, a print data generation step of generating, in the information processor, print data using content based on the keyword acquired in the information acquisition step in response to an output of the guidance message, a print data transmission step of transmitting the generated print data from the information processor to the print device, a printing step of executing printing in the print device according to the transmitted print data, and a proficiency determination step of determining, in the information processor, proficiency indicating a level of proficiency of the user for the print instruction. In the guidance step, the guidance message that is used for the acquisition of the keyword in the information acquisition step is generated based on the proficiency.

According to still another aspect of the present disclosure, an information processor is connected, via a network, to a print device that executes printing according to print data, and includes an information acquisition section that acquires, from a voice mediation device, information including a keyword included in a print instruction given by a user by voice, a guidance section that transmits, to the voice mediation device, a guidance message to be output by voice, a print data transmission section that generates print data using content based on the keyword acquired by the information acquisition section in response to an output of the guidance message and transmits the print data to the print device, and a proficiency determination section that determines proficiency indicating a level of proficiency of the user for the print instruction. The guidance section generates, based on the proficiency, the guidance message that is used for the acquisition of the keyword by the information acquisition section.

According to still another aspect of the present disclosure, a non-transitory computer-readable storage medium stores an information processing program for an information processor connected, via a network, to a print device that executes printing according to print data. The program causes a computer to implement an information acquisition function that acquires, from a voice mediation device, information including a keyword included in a print instruction given by a user by voice, a guidance function that transmits, to the voice mediation device, a guidance message to be output by voice, a print data transmission function that generates print data using content based on the keyword acquired by the information acquisition function in response to an output of the guidance message and transmits the print data to the print device, and a proficiency determination function that determines proficiency indicating a level of proficiency of the user for the print instruction. The guidance function generates, based on the proficiency, the guidance message that is used for the acquisition of the keyword by the information acquisition function.

BRIEF DESCRIPTION OF THE DRAWINGS

FIG. 3 is a diagram schematically showing a structural example of print history.

DESCRIPTION OF EXEMPLARY EMBODIMENTS

Figure 1:
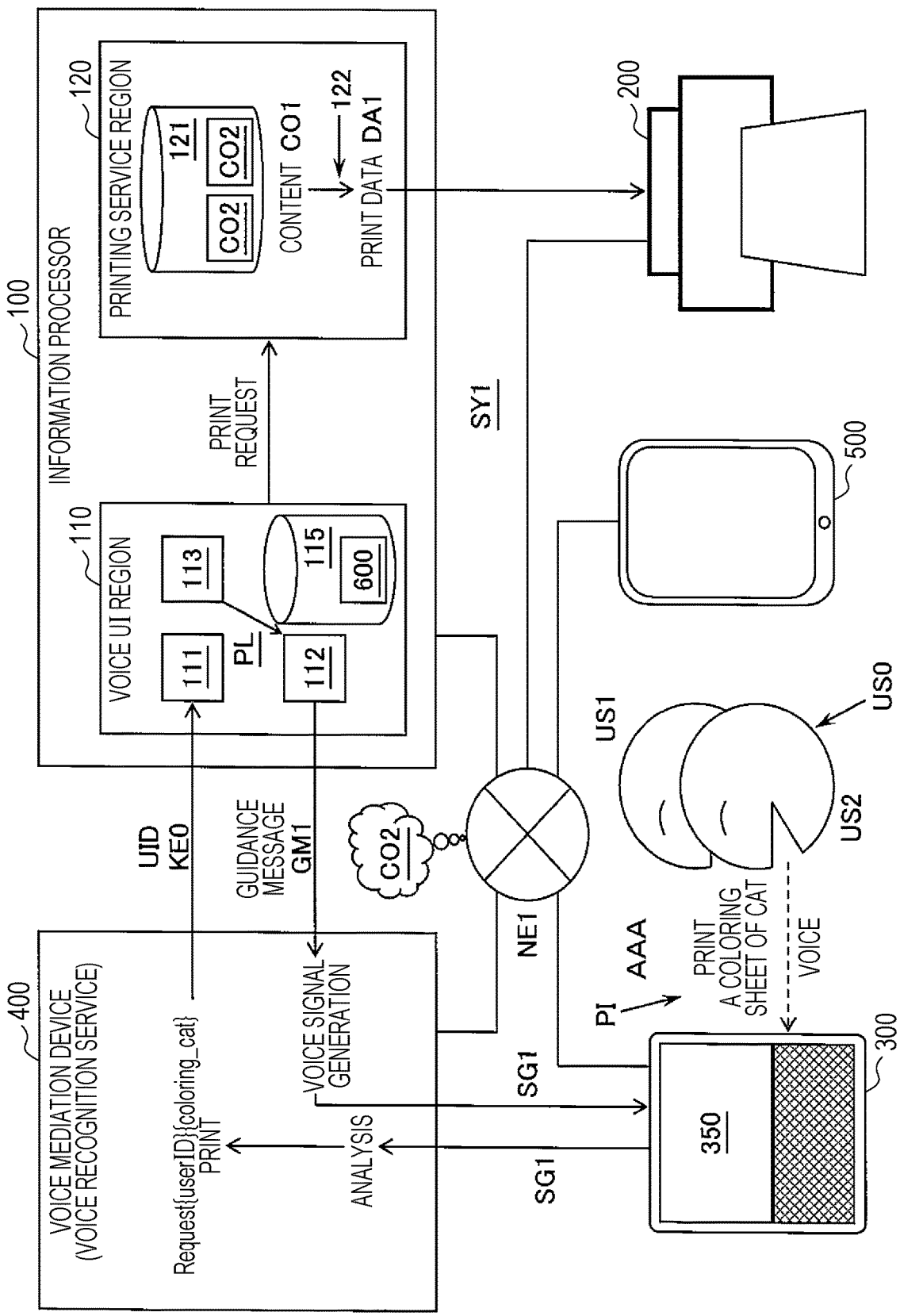
FIG. 1 is a block diagram schematically showing a configuration example of a system including a print system.

Embodiments of the present disclosure will be explained below. Of course, the following embodiments are merely examples of the present disclosure and all the features indicated in the embodiments are not necessarily essential in the solution of the present disclosure.

1. Overview of Technology Ibcluded in Present Disclosure

First, by referring to examples shown in FIGS. 1 to 12, the overview of technology included in the present disclosure will be explained. Note that the drawings of the present application schematically show examples, the enlargement ratios in respective directions shown in the drawings may be different, and the drawings may not be consistent. Of course, each component of the present technology is not limited to a specific example indicated by the reference sign. In the section "Overview of Technology included in Present Disclosure", the term in parentheses is a supplementary explanation of the preceding term.

Embodiment 1

Figure 2:
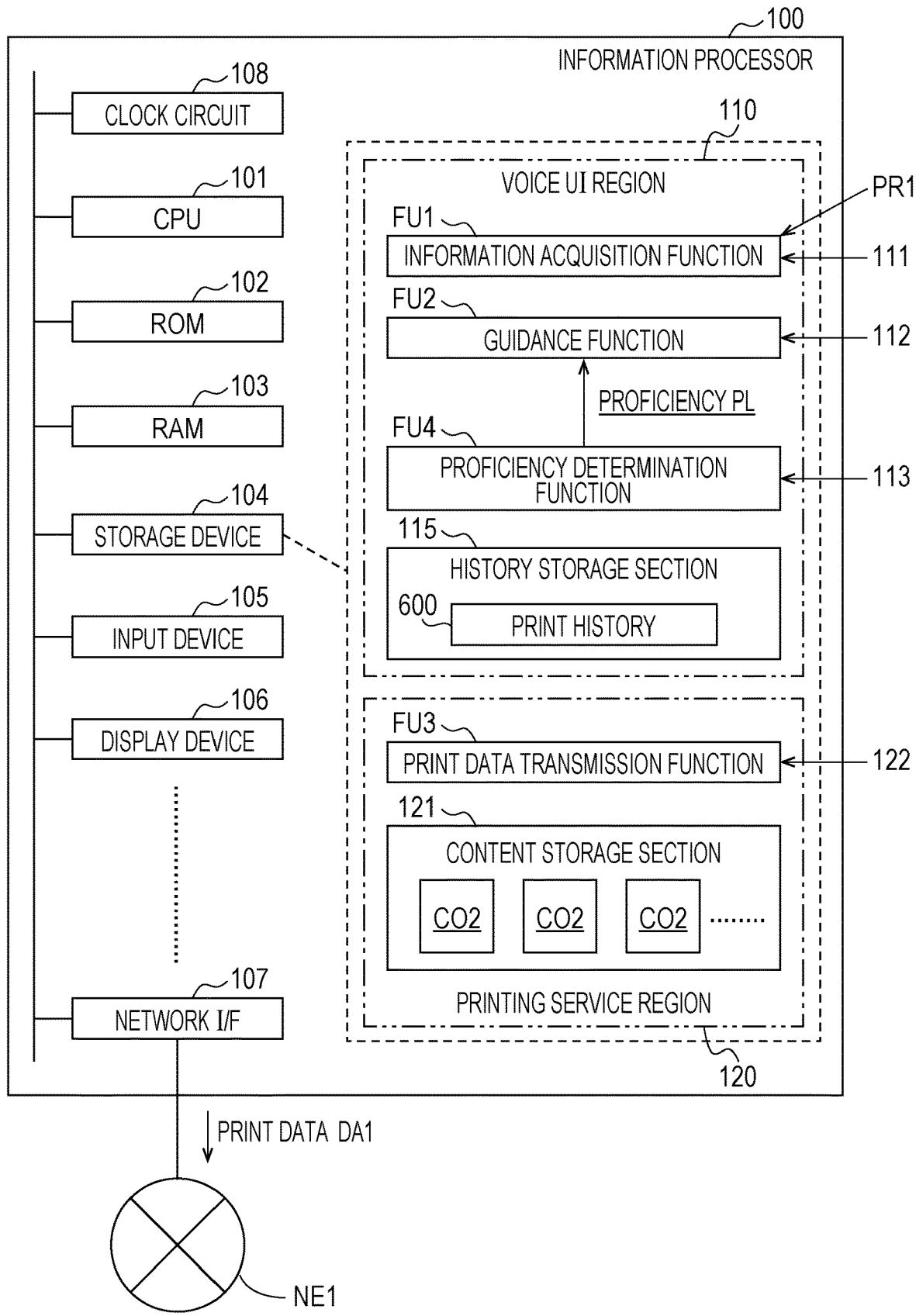
FIG. 2 is a block diagram schematically showing a configuration example of an information processor.
Figure 6:
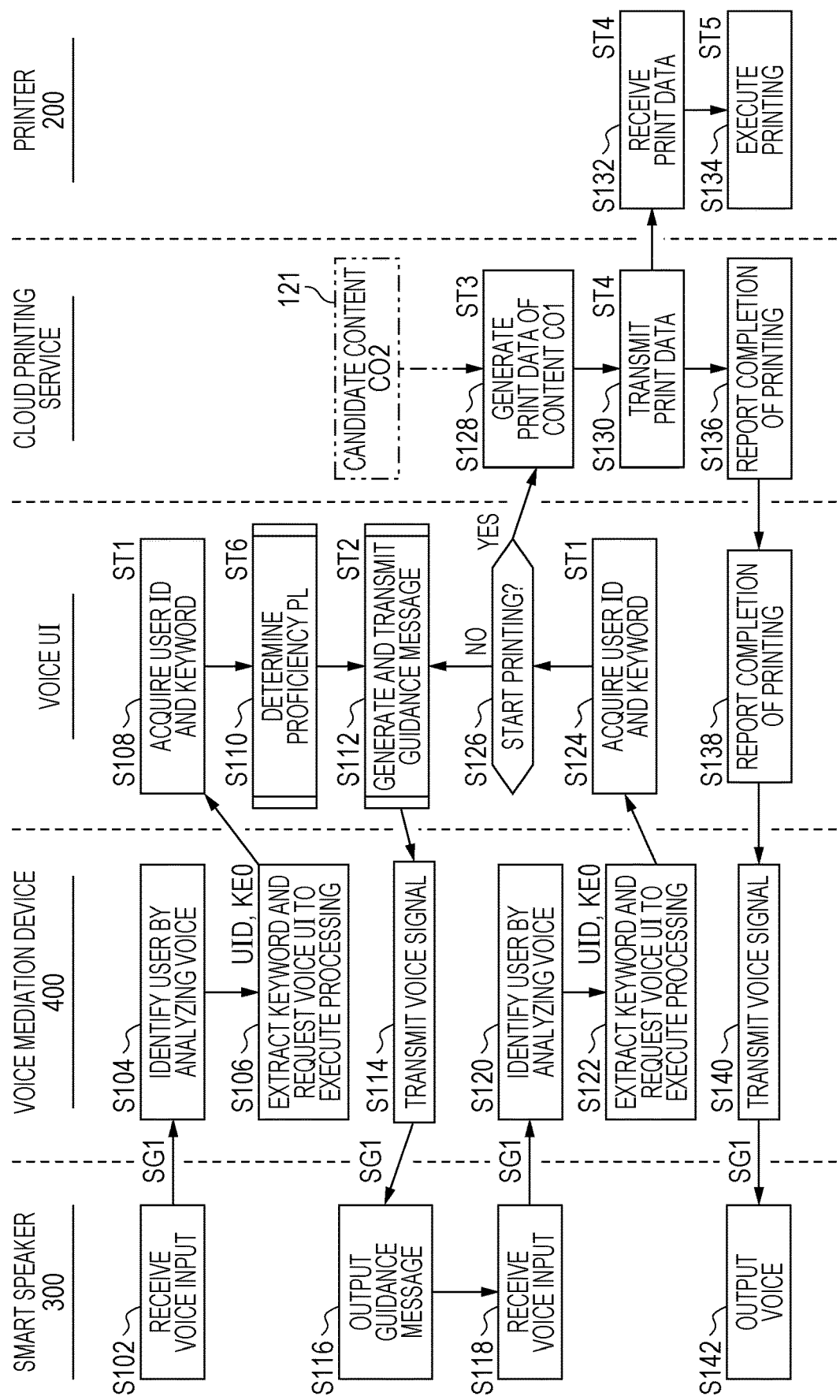
FIG. 6 is a diagram schematically showing an example of processing from voice input to print execution.
Figure 7:
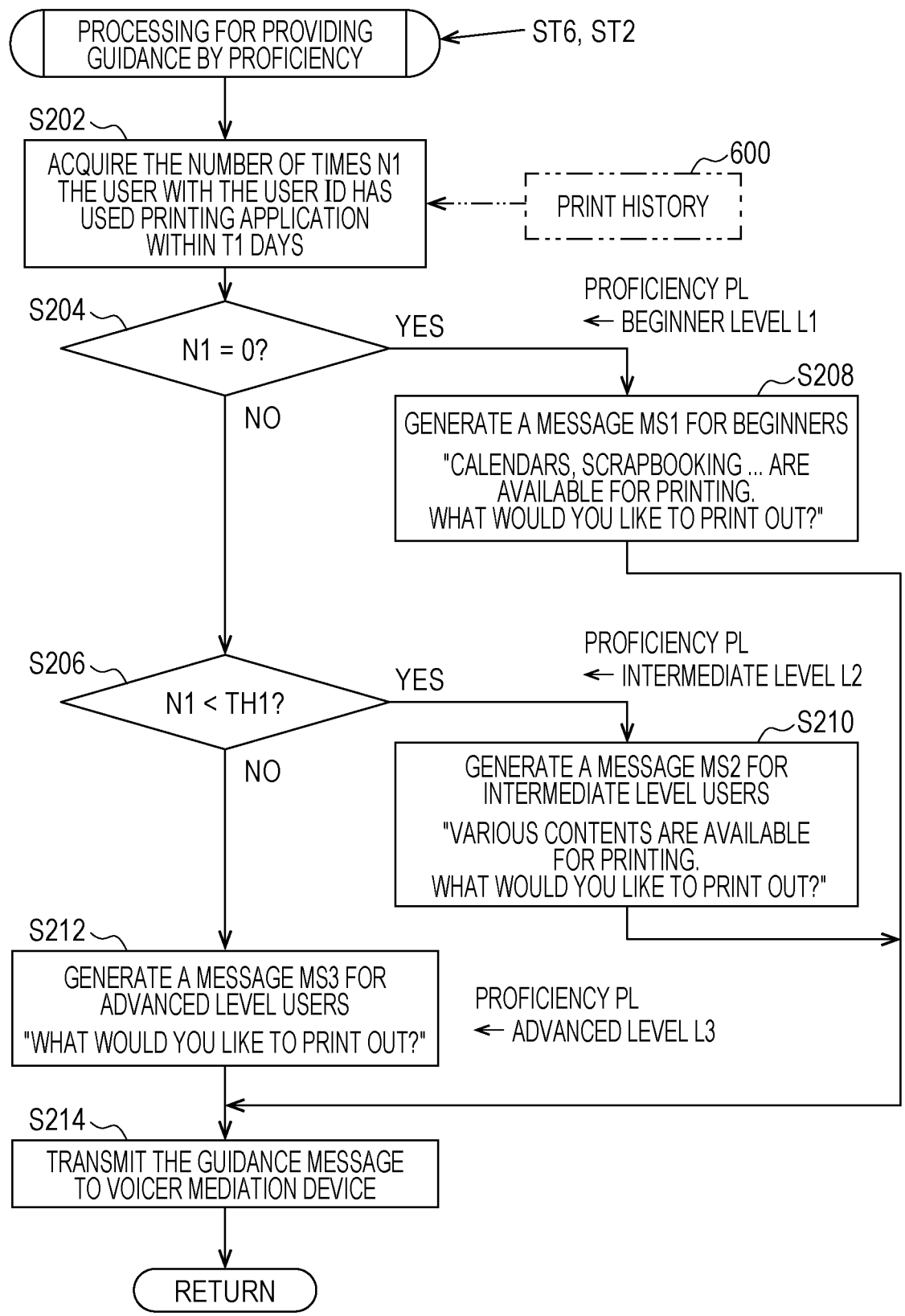
FIG. 7 is a flowchart schematically showing an example of processing for providing guidance by proficiency.

As shown in examples of FIGS. 1 and 2, a print system SY1 according to one aspect of the present technology includes a print device (e.g., a printer 200) and an information processor 100 that is connected to the print device (200) via a network NE1. The information processor 100 includes an information acquisition section 111, a guidance section 112, a print data transmission section 122, and a proficiency determination section 113. The information acquisition section 111 acquires information including a keyword KE0, which is included in a print instruction PI given by a user US0 by voice, from a voice mediation device 400. The guidance section 112 transmits a guidance message GM1, which is to be output by voice, to the voice mediation device 400. As shown in FIGS. 2, 6 and so on, the print data transmission section 122 generates print data DA1 using a content CO1 that is based on the keyword KE0 acquired by the information acquisition section 111 in response to an output of the guidance message GM1, and transmits the print data DA1 to the print device (200). As shown in FIGS. 2, 6, 7, and so on, the proficiency determination section 113 determines proficiency PL indicating a level of proficiency of the user US0 for the print instruction PI. Based on the proficiency PL, the guidance section 112 generates the guidance message GM1 that is used for the acquisition of the keyword KE0 by the information acquisition section 111. The print device (200) receives the print data DA1 and executes printing according to the print data DA1.

In Embodiment 1 described above, the guidance message GM1, which is used to acquire the keyword KE0 included in the print instruction PI given by the user US0 by voice, is generated based on the proficiency PL of the user US0. Because the guidance message GM1 corresponding to the proficiency level of the user US0 is output by voice to the user US0, the user US0 feels less annoyed by the message. Therefore, Embodiment 1 can improve the user-friendliness of the print system.

In this case, the information processor may be formed of a single computer or a plurality of computers connected to each other.

The keyword is not limited to a word, and may be a group of words, such as a phrase or a clause, as long as the word(s) is/are used collectively to identify what to print out.

Note that the abovementioned additional remarks shall be applied to the following embodiments.

Embodiment 2

As shown in an example of FIG. 7. the guidance section 112 may generate a first message (e.g., a message MS1 for beginners) as the guidance message GM1 when the proficiency PL is a first level (e.g., beginner level L1), and may generate a second message (e.g., a message MS2 for intermediate level users), which is shorter than the first message (MS1), as the guidance message GM1 when the proficiency PL is a second level (e.g., intermediate level L2), which is higher than the first level (L1). In Embodiment 2, the guidance message GM1 becomes shorter as the proficiency of the user US0 increased, and, as a result, annoyance of the message is reduced in a more appropriate manner for the user US0, and the user-friendliness is further improved.

In this case, the second message, which is relatively short, may be generated by omitting a part of the relatively long first message, or may be a message that is different from the first message. This additional remark shall be applied to the following embodiments.

Embodiment 3

As shown in examples of FIGS. 2, 3 and so on, the information processor 100 may further include a history storage section 115 that stores print history 600 indicating a history R0 of the printing executed by the print device (200). As shown in an example of FIG. 7 and so on, the proficiency determination section 113 may determine the proficiency PL based on the print history 600 stored in the history storage section 115. Embodiment 3 can provide an appropriate example for reducing annoyance to the user US0.

Embodiment 4

As shown in an example in drawing, the proficiency determination section 113 may acquire, based on the print history 600, the number of times N1 the printing was performed by the user US0 in a predetermined period (e.g., T1 days), and may determine the proficiency PL based on the number of times N1. When the proficiency PL is the second level (L2), which is higher than the first level (L1), the number of times N1 may be greater than the number of times N1 of a case where the proficiency PL is the first level (L1). Because the user US0 tends to have higher proficiency as the number of times N1 the user US0 performed printing within the predetermined period increases, annoyance of the message to the user US0 is reduced in a more appropriate manner, and the user-friendliness is further improved in Embodiment 4.

In this case, the number of times printing was performed by the user within the predetermined period may be zero. This additional remark should be applied to the following embodiments.

Embodiment 5

Figure 8:
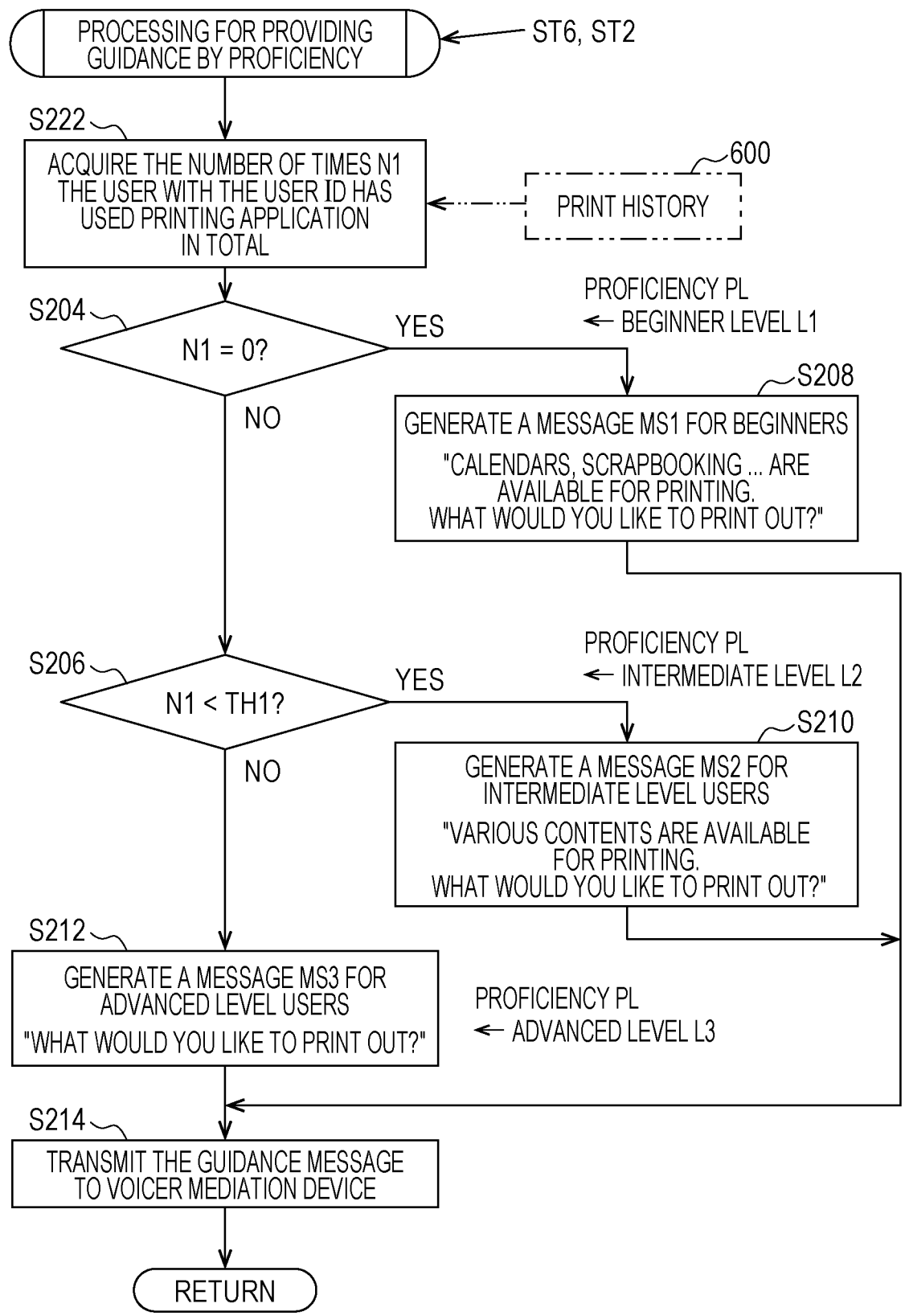
FIG. 8 is a flowchart schematically showing one modification example of the processing for providing guidance by proficiency.

As shown in an example of FIG. 8, the proficiency determination section 113 may acquire the number of times N1 the printing was performed by the user US0 indicated in the print history 600, and may determine the proficiency PL based on the number of times N1. When the proficiency PL is the second level (L2), which is higher than the first level (L1), the number of times N1 may be greater than the number of times N1 of a case where the proficiency PL is the first level (L1). Because the user US0 tends to have higher proficiency as the number of times N1 the user US0 performed printing increases, annoyance of the message to the user US0 is reduced in a more appropriate manner, and the user-friendliness is further improved in Embodiment 5.

Embodiment 6

As shown in an example of FIG. 3, the history storage section 115 may store the print history 600 in such a manner that category information CA1, which indicates a category selected among from a plurality of categories that classifies a plurality of candidate contents CO2, is associated with a history R0 of the printing. As shown in an example of FIG. 9, the proficiency determination section 113 may acquire the number of times N1 that is associated with the category information CA1 indicating a category selected from among the plurality of categories, and may determine the proficiency PL based on the number of times N1. Because the guidance message GM1 corresponding to the proficiency level of the user US0 for each category of the content CO1 is output by voice, Embodiment 6 can further provide an appropriate example for reducing annoyance to the user.

Embodiment 7

Figure 10:
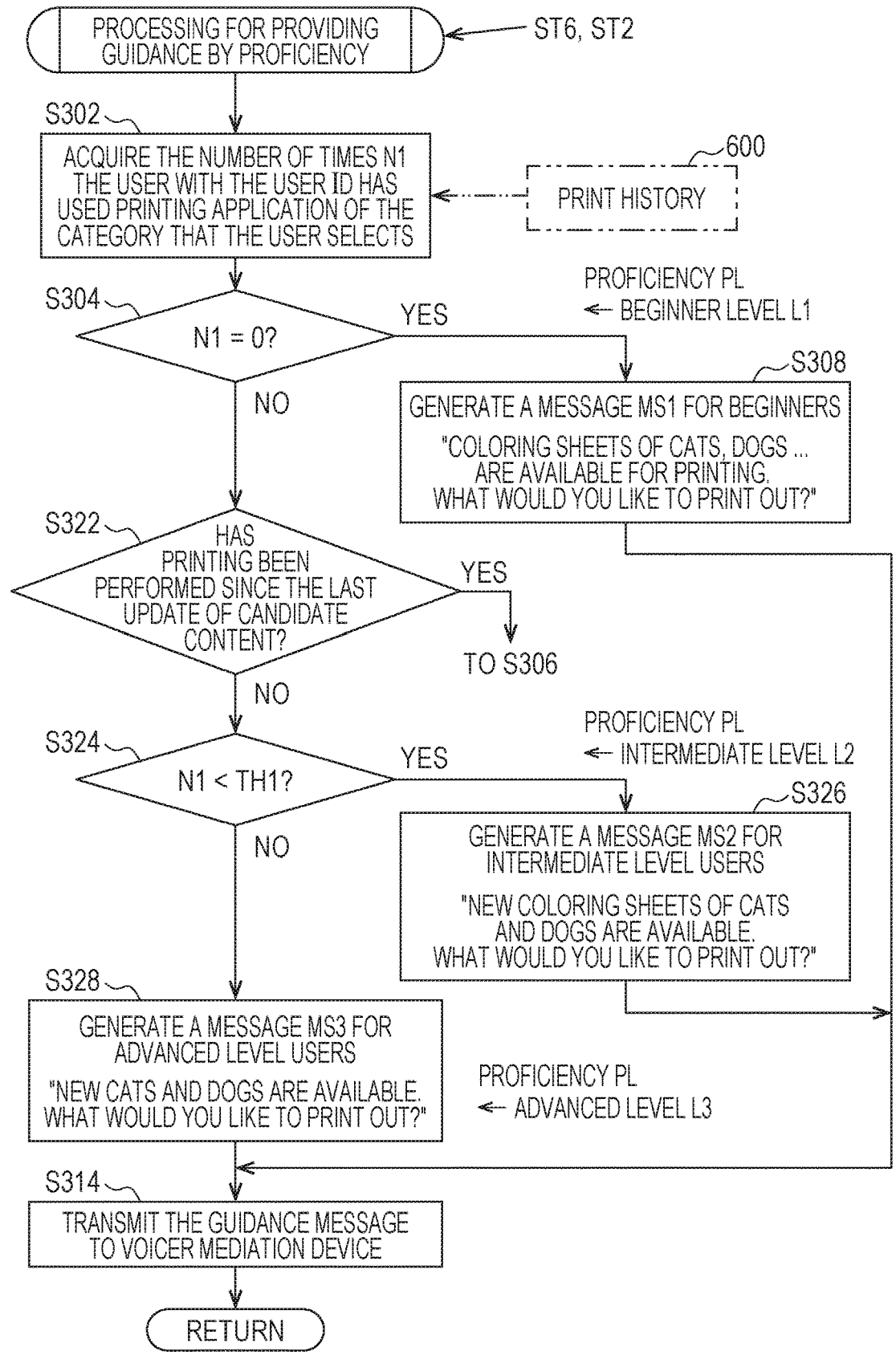
FIG. 10 is a flowchart schematically showing still another modification example of the processing for providing guidance by proficiency.

As shown in an example of FIG. 10, when the plurality of candidate contents CO2 is changed and the print history 600 includes a history R0 of the printing by the user US0, the guidance section 112 may cause the voice mediation device 400 to output by voice telling that the plurality of candidate contents CO2 has been changed. In Embodiment 7, the user US0 who executes printing by voice can know the change in the candidate contents CO2, and thus the user-friendliness is further improved.

Embodiment 8

As shown in an example of FIG. 3, the history storage section 115 may store the print history 600 in such a manner that identification data UID of the user US0 is associated with a history R0 of the printing. As shown in an example of FIG. 6, the information acquisition section 111 may acquire the identification data UID associated with the keyword KE0 from the voice mediation device 400. As shown in an example of FIG. 7 and so on, the proficiency determination section 113 may acquire the number of times N1 of the printing associated with the acquired identification data UID from the print history 600, and may determine the proficiency PL of the user US0 based on the number of times N1. Because the guidance message GM1 corresponding to the proficiency level of the user US0 is output by voice for each user US0, Embodiment 8 can further provide an appropriate example for reducing annoyance to the user.

Embodiment 9

Figure 11:
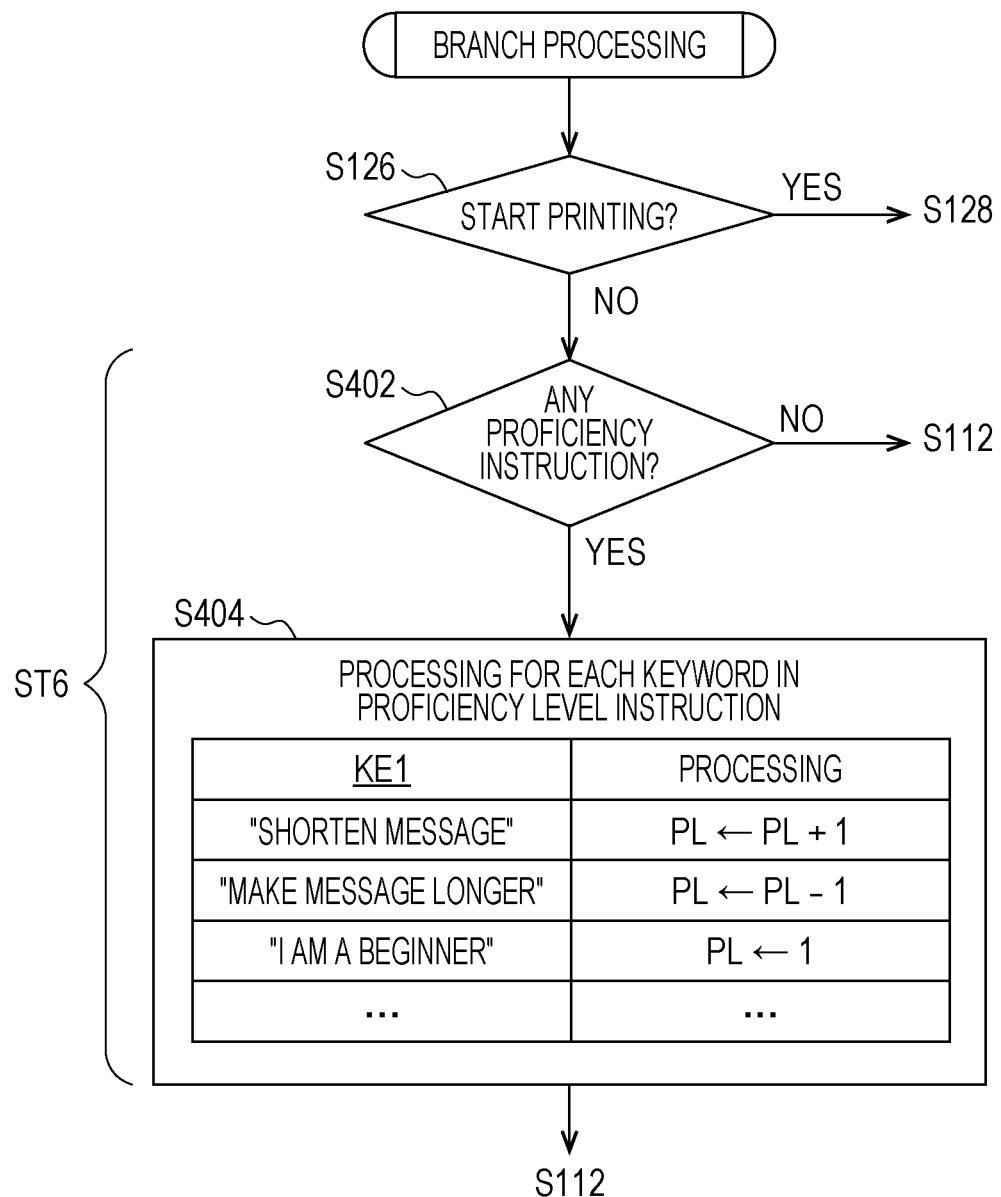
FIG. 11 is a flowchart schematically showing an example of branch processing.

As shown in an example of FIG. 11, the proficiency determination section 113 may acquire a proficiency instruction keyword KE1, in which the proficiency PL is specified by voice, from the voice mediation device 400, and may determine the proficiency PL based on the proficiency instruction keyword KE1. Because the user US0 can specify the proficiency level by himself, Embodiment 9 can further provide an appropriate example for reducing annoyance to the user.

Embodiment 10

Figure 12:
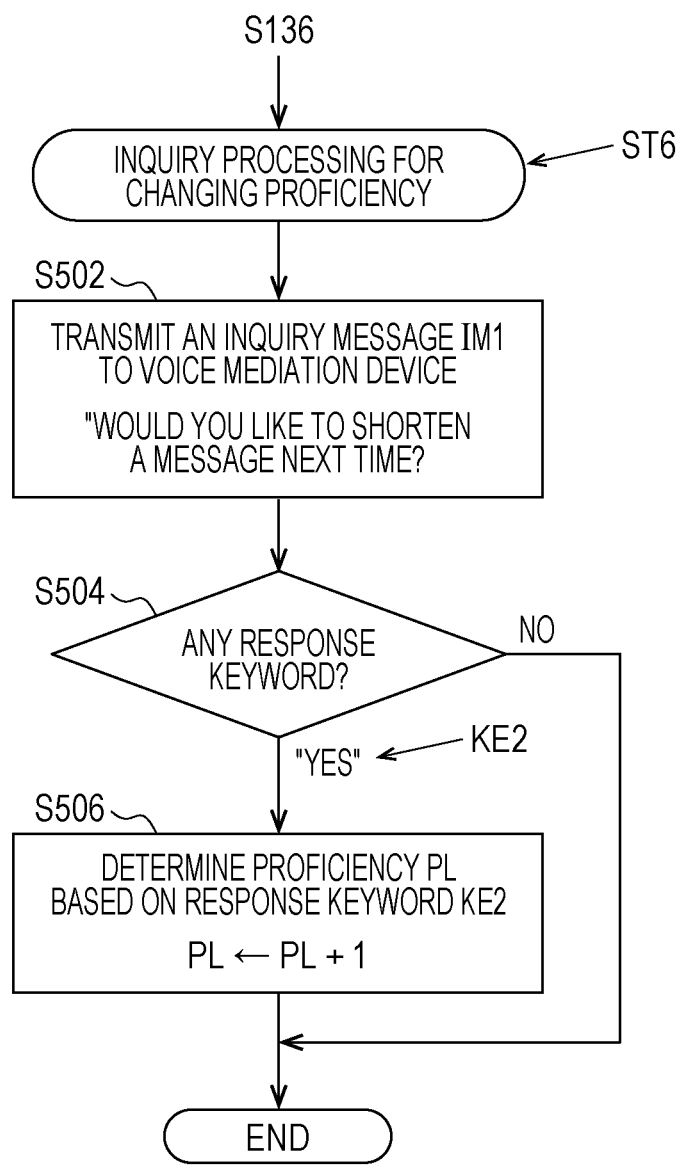
FIG. 12 is a flowchart schematically showing an example of inquiry processing for changing proficiency.

As shown in an example of FIG. 12, the proficiency determination section 113 may cause the voice mediation device 400 to output by voice an inquiry message IM1 asking whether to change the proficiency PL, acquire an response keyword KE2, in which a response to the inquiry message IM1 is instructed, from the voice mediation device 400, and determine the proficiency PL based on the response keyword KE2. Because the proficiency PL is changed corresponding to the response to the inquiry, Embodiment 10 can further provide an appropriate example for reducing annoyance to the user.

Embodiment 11

The print method according to another aspect of the present technology uses the print device (200) and the information processor 100 connected to the print device (200) via the network NE1, and includes an information acquisition step ST1, a guidance step ST2, a print data generation step ST3, a print data transmission step ST4, a printing step ST5, and a proficiency determination step ST6. In the information acquisition step ST1, the information processor 100 acquires, from the voice mediation device 400, information including the keyword KE0 included in a print instruction PI provided by the user US0 by voice. In the guidance step ST2, the information processor 100 transmits a guidance message GM1, which is to be output by voice, to the voice mediation device 400. In the print data generation step ST3, information processor 100 generates print data DA1 using a content CO1 that is based on the keyword KE0 acquired in the information acquisition step ST1 in response to an output of the guidance message GM1. In the print data transmission step ST4, the generated print data DA1 is transmitted from the information processor 100 to the print device (200). In the printing step ST5, the print device (200) executes printing according to the transmitted print data DA1. In the proficiency determination step ST6, the information processor 100 acquires proficiency PL indicating a level of proficiency of the user US0 for the print instruction PI. In the guidance step ST2, the guidance message GM1, which is used for acquiring the keyword KE0 in the information acquisition step ST1, is generated based on the proficiency PL. Therefore, Embodiment 11 can provide the print method with which the user-friendliness is improved.

Embodiment 12

Furthermore, the information processor 100 according to still another aspect of the present technology is connected to the print device (200), which executes printing according to the print data DA1, via the network NE1, and includes the information acquisition section 111, the guidance section 112, the print data transmission section 122, and the proficiency determination section 113. The information acquisition section 111 acquires information including a keyword KE0, which is included in a print instruction PI given by the user US0 by voice, from a voice mediation device 400. The guidance section 112 transmits a guidance message GM1, which is to be output by voice, to the voice mediation device 400. The print data transmission section 122 generates print data DA1 using a content CO1 that is based on the keyword KE0 acquired by the information acquisition section 111 in response to an output of the guidance message GM1, and transmits the print data DA1 to the print device (200). The proficiency determination section 113 determines proficiency PL indicating a level of proficiency of the user US0 for the print instruction PI. Based on the proficiency PL, the guidance section 112 generates the guidance message GM1 that is used for the acquisition of the keyword KE0 by the information acquisition section 111. Therefore, Embodiment 12 can provide the information processor with which the user-friendliness is improved.

Embodiment 13

Moreover, according to still another aspect of the present technology, a non-transitory computer-readable storage medium stores an information processing program PR1 for the information processor 100, which is connected, via the network NE1, to the print device (200) that executes printing according to the print data DA1. The information processing program PR1 causes a computer (the information processor 100) to implement an information acquisition function FU1, a guidance function FU2, a print data transmission function FU3, and a proficiency determination function FU4. The information acquisition function FU1 acquires information including a keyword KE0, which is included in a print instruction PI given by the user US0 by voice, from a voice mediation device 400. The guidance function FU2 transmits a guidance message GM1, which is to be output by voice, to the voice mediation device 400. The print data transmission function FU3 generates print data DA1 using a content CO1 that is based on the keyword KE0 acquired by the information acquisition function FU1 in response to an output of the guidance message GM1, and transmits the print data DA1 to the print device (200). The proficiency determination function FU4 determines proficiency PL indicating a level of proficiency of the user US0 for the print instruction PI. Based on the proficiency PL, the guidance function FU2 generates the guidance message GM1 that is used for the acquisition of the keyword KE0 by information acquisition function FU1. Therefore, Embodiment 13 can provide the non-transitory computer-readable storage medium storing the information processing program with which the user-friendliness is improved.

Furthermore, the present technology can be applied to a multi-function system including the abovementioned print system, a multi-function device including the abovementioned information processor, an information processing method executed in the abovementioned information processor, a non-transitory computer-readable storage medium storing the abovementioned information processing program, and so on. Any of the above devices may be formed of a plurality of separate sections.

2. Specific Example of Configuration of Print System

FIG. 1 schematically shows a specific example of a system configuration including the print system SY1. The system shown in FIG. 1 includes the information processor 100, the printer 200, a smart speaker 300, the voice mediation device 400, and a terminal 500. The print system SY1 may include the information processor 100 and the printer 200, and may further include the terminal 500. The information processor 100, the printer 200, the smart speaker 300, the voice mediation device 400, and the terminal 500 are connected to the network NE1 including the Internet. The network NE1 including the Internet may include LAN. LAN is the abbreviation for Local Area Network. Connection to the network NE1 may be a wired connection or a wireless connection, or both wired and wireless connections. The information processor 100 is a server computer providing a cloud printing service function and allows the voice mediation device 400 to use a function called voice UI. UI is the abbreviation for user interface. The information processor 100 transmits, to the printer 200, print data DA1 generated based on the keyword KE0 acquired from the voice mediation device 400. The printer 200 is a print device that forms a print image according to the print data DA1 transmitted from the information processor 100. The smart speaker 300 is a voice input/output device that uses a function called a voice recognition service provided by the voice mediation device 400. The voice mediation device 400 is a server computer that provides a voice recognition service using AI. AI is the abbreviation for artificial intelligence.

Note that, in the explanation below, the "voice UI" indicates a section exhibiting a function called voice UI in the information processor 100, and the "cloud printing service" indicates a section exhibiting a function called cloud printing service in the information processor 100.

The information processor 100 includes a voice UI region 110 that is a storage region for information for implementing the voice UI and a printing service region 120 that is a storage region for information for implementing the cloud printing service. The voice UI is a service that is built on a voice recognition service platform by a provider of the cloud printing service. The voice UI region 110 includes an information region for implementing the information acquisition section 111, the guidance section 112, and the proficiency determination section 113 and the history storage section 115 storing the print history 600. Here, the user US0 shown in FIG. 1 is a general term of a user US1 and a user US2. The printing service region 120 includes a content storage section 121 storing a plurality of candidate contents CO2 and an information region for implementing the print data transmission section 122. Of course, the voice UI and the cloud printing service may be built on separate computers. In addition, the voice UI may be built on a server computer that provides a voice recognition service.

For example, when a user US2 calls the print system SY1 by using its nickname "AAA", the smart speaker 300 converts the voice of the user US2 into a digital voice signal SG1 and transmits the voice signal SG1 to the voice mediation device 400 via the network NE1. After receiving the voice signal SG1, the voice mediation device 400 analyzes the voice based on the voice signal SG1, identifies the user US2, informs the voice UI that the print system SY1 is called, and provides identification data UID of the user US2 and the keyword KE0 "AAA" to the voice UI. After receiving the identification data UID and the keyword KE0, the voice UI determines the proficiency PL of the user US2 for the print instruction PI based on the identification data UID and the print history 600, generates the guidance message GM1 based on the proficiency PL, and transmits the guidance message GM1 to the voice mediation device 400. After receiving the guidance message GM1, the voice mediation device 400 converts the guidance message GM1 into a digital voice signal SG1 and transmits the voice signal SG1 to the smart speaker 300 via the network NE1. After receiving the voice signal SG1, the smart speaker 300 converts the voice signal SG1 into voice and outputs the voice. Consequently, the guidance message GM1 corresponding to the proficiency level of the user US2 is read aloud by voice.

After hearing the guidance message GM1, the user US2 tells by voice "print out a coloring sheet of a cat", the smart speaker 300 converts the voice of the user US2 into a digital voice signal SG1 and transmits the voice signal SG1 to the voice mediation device 400 via the network NE1. After receiving the voice signal SG1, the voice mediation device 400 analyzes the voice based on the voice signal SG1, identifies the user US2, and requests the voice UI to execute printing when the voice includes a print request keyword "print out", and provides the identification data UID of the user US2 and the keyword KE0 "coloring sheet of a cat" included in the voice to the voice UI. The string "Request{userID} {coloring_cat}PRINT" shown in FIG. 1 represents an example of a request including the identification data UID and the keyword KE0. The string "{userID}" indicates the identification data of a user. The string "{coloring_cat}" indicates a keyword such as "coloring sheet of a cat". After receiving the identification data UID and the keyword KE0 in addition to the print request keyword, the voice UI issues a print request of content CO1 specified by the identification data UID and the keyword KE0 to the cloud printing service. After receiving the print request, the cloud printing service generates print data DA1 using the content CO1 and transmits the print data DA1 to the printer 200 via the network NE1. The content CO1 may be determined from the plurality of candidate contents CO2 stored in the content storage section 121 or may be acquired from one or more candidate contents CO2 stored in an external server computer (not shown) via the network NE1. After receiving the print data DA1, the printer 200 executes printing according to the print data DA1. Consequently, the content CO1, which is the "coloring sheet of a cat" that the user US2 asked, is printed out. Note that, not only an object to be printed out but also a printer 200 that the user US2 wants to use as an output destination may be specified by the keyword KE0, by telling like "print out a coloring sheet of a cat by A-company printer".

Of course, the print request keyword is not limited to the term "print out" and may be similar variations such as "perform printing". Thus, processing similar to the processing for the voice including the print request keyword "print out" may be executed for the processing of the voice including such variations.

FIG. 2 schematically shows a configuration example of the information processor 100. Although the information processor 100 shown in FIG. 2 is a single server computer having the voice UI region 110 and the printing service region 120, the information processor may be formed of a plurality of server computers connected to each other. For example, the information processor may be formed of a server computer having the voice UI region 110 and another server computer having the printing service region 120. In addition, the voice UI region 110 may be built on a server computer providing a voice recognition service, and in this case also, the information processor 100 including the voice UI region 110 and the printing service region 120 is formed.

The information processor 100 shown in FIG. 2 includes a CPU 101 as a processor, a ROM 102 of a semiconductor memory, a RAM 103 of a semiconductor memory, a storage device 104, an input device 105, a display device 106, a network I/F 107, a clock circuit 108, and so on. These components 101 to 108 are electrically connected to each other, thereby being capable of inputting and outputting information to and from each other. Here, CPU is the abbreviation for Central Processing Unit, ROM is the abbreviation for Read Only Memory, RAM is the abbreviation for Random Access Memory, and I/F is the abbreviation for interface.

The storage device 104 stores an OS (not shown) and so on, and has the abovementioned regions 110 and 120. Here, OS is the abbreviation for operation system. The voice UI region 110 includes the history storage section 115 storing the print history 600 and stores programs, such as a program for causing the information processor 100 to implement the information acquisition function FU1, the guidance function FU2, and the proficiency determination function FU4. The printing service region 120 includes the content storage section 121 storing a plurality of candidate contents CO2 and stores programs, such as a program for causing the information processor 100 to implement the print data transmission function FU3. The information processing program PR1 includes a program for causing the information processor 100 to implement the functions FU1 to FU4. The information stored in the storage device 104 is read out to the RAM 103 as needed and is used in processing for causing the printer 200 to execute printing. As the storage device 104, a magnetic storage device such as a hard disk, a non-volatile semiconductor memory such as a flash memory, or other similar device can be used. Note that, it can be said that the information processing program PR1 is a printing application for the user US0.

As the input device 105, a pointing device, a hardware key including a keyboard, a touch panel provided on the surface of a display panel, or other similar device can be used. As the display device 106, a liquid crystal display panel or the like can be used. The network I/F 107 is connected to the network NE1 and is configured to communicate with a destination device connected to the network NE1 according to a predetermined communication standard. The clock circuit 108 is configured to output the current date and time.

By executing the information processing program PR1 read from the storage device 104 to the RAM 103, the CPU 101 executes information acquisition processing corresponding to the information acquisition function FU1, guidance processing corresponding to the guidance function FU2, print data transmission processing corresponding to the print data transmission function FU3, and proficiency determination processing corresponding to the proficiency determination function FU4. The information processing program PR1 causes the information processor 100 to function as the information acquisition section 111 corresponding to the information acquisition function FU1, the guidance section 112 corresponding to the guidance function FU2, the print data transmission section 122 corresponding to the print data transmission function FU3, and the proficiency determination section 113 corresponding to the proficiency determination function FU4. The information processor 100, which executes the information processing program PR1, executes the information acquisition step ST1, the guidance step ST2, the print data generation step ST3, the print data transmission step ST4, the printing step ST5, and the proficiency determination step ST6, as shown in FIG. 6. The computer-readable medium storing the information processing program PR1 is not limited to the storage device 104, and may be an external recording medium provided outside the information processor 100.

FIG. 3 schematically shows a structural example of the print history 600 stored in the history storage section 115. The print history 600 represents a history R0 of printing executed by the printer 200. A history R0 is generated every time printing is executed. Each history R0 includes the user ID indicating the identification data UID of the user US0, the category information CA1 indicating the category of the content CO1, the content ID indicating the identification data of the printed content CO1, and the print date and time. That is, the user ID, the category information CA1, and the content ID are associated with the print date and time so that the corresponding history R0 can be specified. Note that, ID is the abbreviation for identification data. In an example shown in FIG. 3, the identification data UID for the user US1 is "UID1", the identification data UID for the user US2 is "UID2", and the identification data UID for a third user is "UID3". Because each history R0 includes the user ID, each history R0 is associated with the identification data UID and the user US0. In an example shown in FIG. 3, a history associated with the user US1 in a plurality of histories R0 is referred to as a history R1. The category information CA1 indicates the category selected from a plurality of categories that classifies the plurality of candidate contents CO2. For example, the category "coloring sheet" includes a content with the content ID "001" and a content with the content ID "002". The content ID is used to identify the content CO1 determined from the plurality of candidate contents CO2 stored in the content storage section 121 or an external server computer.

Figure 4:
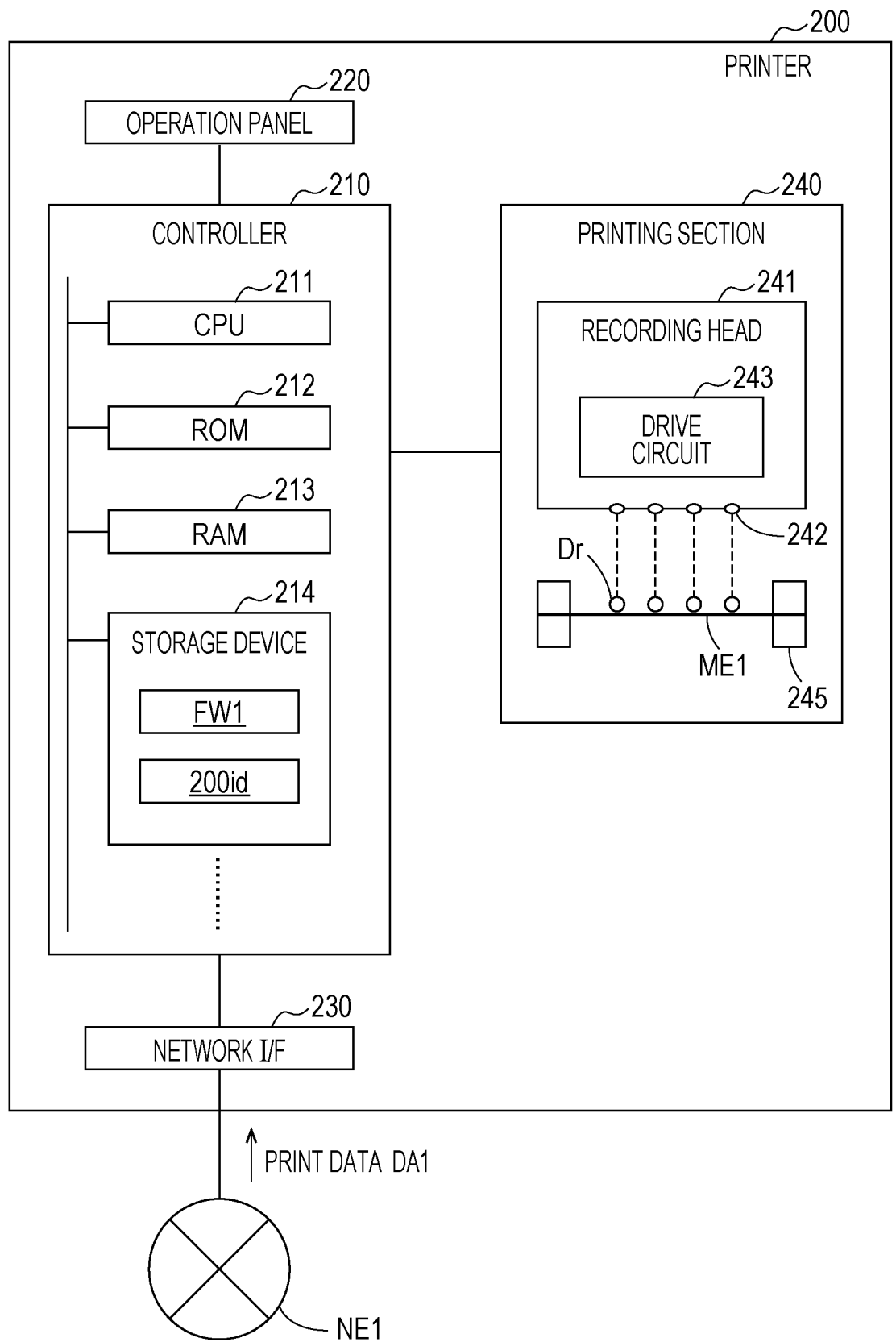
FIG. 4 is a block diagram schematically showing a configuration example of a print device.

FIG. 4 schematically shows a configuration example of the printer 200. The printer 200 shown in FIG. 4 is a print device configured to execute printing according to the print data DA1 received via the network NE1. The printer 200 that can be used in the print system SY1 is not limited to a specific printer and may be an ink jet printer, an electrophotographic printer such as a laser printer, or the like. Of course, the printer 200 may be a copier, a facsimile machine, a multi-function device provided with these functions, or the like. FIG. 4 shows a case where the printer 200 is an ink jet printer.

The printer 200 shown in FIG. 4 includes a controller 210, an operation panel 220, a network I/F 230, and a printing section 240.

The controller 210 includes a CPU 211, a ROM 212, a RAM 213, a storage device 214, and so on. These components 211 to 214 are electrically connected to each other, thereby being capable of inputting and outputting information to and from each other. That is, the printer 200 is a type of computer. The storage device 214 stores firmware FW1 that causes a computer to function as the printer 200, a printer identification data 200id for identifying each printer 200, and so on. As the printer identification data 200id, an email address, an IP address, a serial number, or the like can be used. Here, IP address is the abbreviation for Internet Protocol Address. As the storage device 214, a non-volatile semiconductor memory such as a flash memory, a magnetic storage device such as a hard disk, or other similar device can be used.

The operation panel 220 includes a display section, an operation input section, and so on and receives operation made by a user. The display section is formed of, for example, a liquid crystal panel and displays information indicating the status of the printer 200, information indicating an instruction from the user, and so on. The operation input section is formed of, for example, a plurality of operation keys including cursor movement keys and an enter key. The operation input section may be a touch panel or a similar device that receives an operation on a display screen.

The network I/F 230 is connected to the network NE1 and is configured to communicate with a destination device in the network NE1 according to a predetermined communication standard.

The printing section 240 includes a recording head 241 that ejects a liquid droplet Dr, such as an ink droplet, to a print substrate ME1, and a paper transport section 245 that transports the print substrate ME1. The recording head 241 includes a plurality of nozzles 242 from each of which the liquid droplet Dr is ejected, and a drive circuit 243 that causes each nozzle 242 to eject the liquid droplet Dr. As the drive circuit 243, a circuit that drives a piezoelectric element, which applies pressure to liquid in a pressure chamber communicated with each nozzle 242, or a circuit that drives a thermal element, which generates a bubble in the liquid in each pressure chamber by heat, or the like may be used. When the liquid droplet Dr lands on the print substrate ME1, which was transported by the paper transport section 245, a print image corresponding to the print data DA1 transmitted from the information processor 100 is formed on the print substrate ME1.

Note that the print substrate is a material that holds a print image. As the print substrate, paper, resin, metal, or the like can be used. The shape of the print substrate is typically rectangular or a rolled shape, but may be a substantially circle shape like an optical disc, a polygonal shape other than a rectangular, a three-dimensional shape, or the like.

Figure 5:
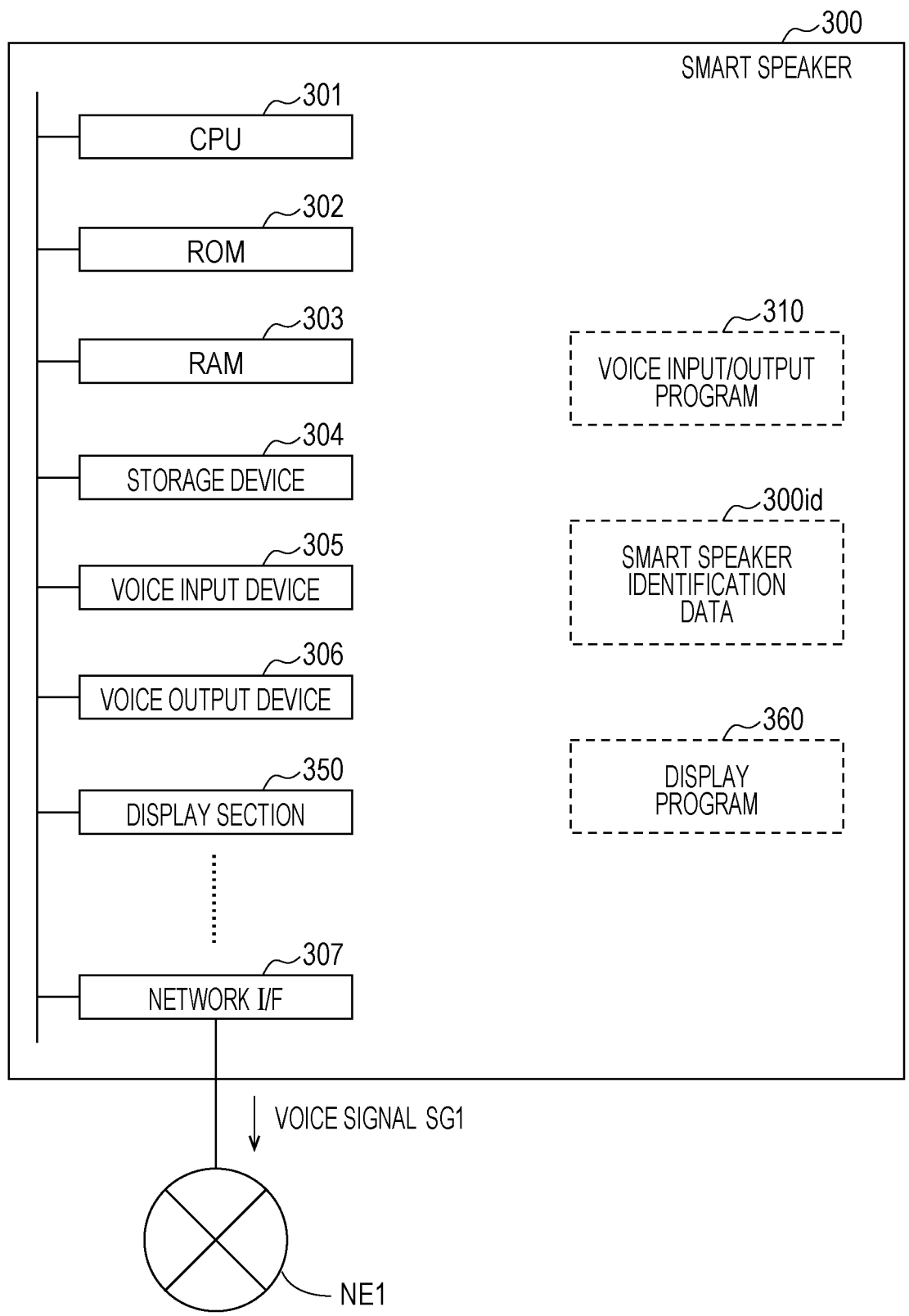
FIG. 5 is a block diagram schematically showing a configuration example of a voice input/output device.

FIG. 5 schematically shows a configuration example of the smart speaker 300 that uses in the voice recognition service of the voice mediation device 400. The smart speaker 300 shown in FIG. 5 includes a CPU 301, a ROM 302, a RAM 303, a storage device 304, a voice input device 305, a voice output device 306, a network I/F 307, a display section 350, and so on. These components 301 to 307 and 350 are electrically connected to each other, thereby being capable of inputting and outputting information to and from each other. That is, the smart speaker 300 is a type of computer. The storage device 304 stores a voice input/output program 310 that causes a computer to function as the smart speaker 300, a smart speaker identification data 300id for identifying each smart speaker 300, a display program 360 for controlling display of the display section 350, and so on. As the storage device 304, a non-volatile semiconductor memory such as a flash memory, a magnetic storage device such as a hard disk, or other similar device can be used. The display section 350 is formed of, for example, a liquid crystal panel and displays information indicating the status of the smart speaker 300, and so on.

Note that, in place of the smart speaker 300 provided with the display section 350, a smart speaker having no display section may be used.

The voice input device 305 includes a microphone and, after the microphone converts voice input from the outside into an analog electric signal, converts the electric signal into a digital voice signal SG1. One or more than one voice input device 305 may be provided in the smart speaker 300. The voice output device 306 includes a speaker in a narrow sense that converts an electric signal into sound. The speaker converts the digital voice signal SG1 into an analog electric signal, then convers the electric signal into voice, and outputs the voice to the outside. One or more than one voice output device 306 may be provided in the smart speaker 300. The network I/F 307 is connected to the network NE1 and is configured to communicate with a destination device in the network NE1 according to a predetermined communication standard.

The voice mediation device 400 shown in FIG. 1 is a server computer and includes, for example, a CPU, a ROM, a RAM, a storage device, an input device, a display device, a network I/F, and so on.

As the terminal 500 shown in FIG. 1, a mobile terminal such as a smart phone or a tablet terminal, a personal computer, or the like can be used.

3. Specific Example of Processing in System

FIG. 6 schematically shows an example of processing from voice input to print execution in a system including the print system SY1. FIG. 7 schematically shows an example of processing for providing guidance by proficiency executed in steps S110 to S112 of FIG. 6. As described above, the "voice UI" indicates a section exhibiting a function called voice UI in the information processor 100, and the "cloud printing service" indicates a section exhibiting a function called cloud printing service in the information processor 100. In this case, steps S108 and S124 correspond to the information acquisition step ST1, the information acquisition section 111, and the information acquisition function FU1. Steps S110 and S202 to S206 correspond to the proficiency determination step ST6, the proficiency determination section 113, and the proficiency determination function FU4. Steps S112 and S208 to S214 correspond to the guidance step ST2, the guidance section 112, and the guidance function FU2. Step S128 corresponds to the print data generation step ST3. Steps S130 to S132 correspond to the print data transmission step ST4. Steps S128 to S132 correspond to the print data transmission section 122 and the print data transmission function FU3. Step S134 corresponds to the printing step ST5. In the following explanation, the word "step" may be omitted and a reference sign of each step is indicated in parentheses.

When the user US0 makes an utterance regarding printing to the smart speaker 300 by calling a printer with the nickname "AAA", the smart speaker 300 converts the voice of the US0 into a voice signal SG1 and transmits the voice signal SG1 to the voice mediation device 400 via the network NE1 (S102). When receiving the voice signal SG1, the voice mediation device 400 analyzes the voice based on the voice signal SG1, identifies the user US0, and acquires the identification data UID corresponding to the identified user US0 (S104). Then, the voice mediation device 400 extracts the keyword KE0 from the result of the voice analysis, provides the keyword KE0 and the identification data UID associated with the keyword KE0 to the voice UI, and requests processing to the voice UI (S106).

In the voice mediation device 400, the storage device stores identification data UID for each user and stores information representing a characteristic of voice for each user in association with the identification data UID. The characteristic of voice for identifying a user can be represented by a frequency distribution of the voice, for example. Thus, the voice mediation device 400 may determine a frequency distribution of voice based on the voice signal SG1, acquire, from the storage device, the identification data UID with which the frequency distribution closest to this frequency distribution is associated, and provide this identification data UID to the voice UI. In addition, the smart speaker 300 may receive a voice input of the name of the user US0, and the voice mediation device 400 may acquire the identification data UID associated with the name from the storage device by extracting the name of the user US0 based on the voice signal SG1 and provide the identification data UID to the voice UI.

The voice UI acquires the keyword KE0 included in a voice instruction and the identification data UID associated with the keyword KE0 from the voice mediation device 400 (S108). Next, as shown in FIG. 7, the voice UI determines the proficiency PL indicating the level of proficiency of the user US0 for a print instruction PI (S110). Furthermore, as shown in FIG. 7, the voice UI generates a guidance message GM1 for acquiring a keyword KE0 based on the proficiency PL, and transmits the guidance message GM1 to the voice mediation device 400 (S112).

FIG. 7 shows processing from S110 to S112 all together.

When the processing for providing guidance by proficiency shown in FIG. 7 is started, the voice UI acquires the number of times N1 the user US0 corresponding to the identification data UID has used the printing application within a predetermined T1 days from now (S202). In step S202, the voice UI acquires the number of times N1 the user US0 has performed printing within T1 days based on the print history 600 shown in FIG. 3. For example, assume that the predetermined period T1 is seven days. On 24 Mar. 2020, when the user US1 with the identification data UID1 speaks to the smart speaker 300, the voice UI acquires, as the number of times N1, six histories after 18 Mar. 2020 among the histories R1 with which the identification data UID1 is associated. In addition, on 24 Mar. 2020, when the user US2 with the identification data UID2 speaks to the smart speaker 300, the voice UI acquires, as the number of times N1, two histories after 18 Mar. 2020 among the histories with which the identification data UID2 is associated.

After the voice UI acquires the number of times N1, the processing is branched by the voice UI according to the number of times N1 (S204 to S206). Here, it is assumed that a threshold TH1 for the predetermined period T1 is an integer of two or more.

When the user US0 corresponding to the identification data UID has not used the printing application within T1 days, the number of times N1 printing was performed by the user US0 is zero times. When N1 is zero, the voice UI determines that the proficiency PL of the user US0 is the beginner level L1, and generates a message MS1 for beginners, which is a relatively long message (S208). FIG. 7 indicates that, as the message MS1 for beginners, a message "calendars, scrapbooking . . . are available for printing. What would you like to print out?" is generated. In the present specific example, the beginner level L1 is an example of the first level of the proficiency PL, and the message MS1 for beginners is an example of the first message.

When the number of times the user US0 corresponding to the identification data UID has used the printing application within T1 days is less than TH1 times, the number of times N1 printing was performed by the user US0 is 1≤N1<TH1 times. In this case, the voice UI determines that the proficiency PL of the user US0 is the intermediate level L2, which is higher than the beginner level L1, and generates a message MS2 for intermediate level users, which is shorter than the message MS1 for beginners (S210). That is, the number of times N1 for a case where the proficiency PL is the intermediate level L2 is greater than that for a case where the proficiency PL is the beginner level L1. FIG. 7 indicates that, as the message MS2 for intermediate level users, a message telling "various contents are available for printing. What would you like to print out?" is generated. In this case, the sentence "what would you like to print out?" is used in both messages MS1 and MS2, however the sentence "various contents are available for printing." is not used in the message MS1 for beginners. For example, when T1 is seven and TH1 is three, because the number of times N1 the user US2 with the identification data UID2 shown in FIG. 3 has performed printing within seven days is two, which is less than TH1 times, the message MS2 for intermediate level users is generated. In the present specific example, the intermediate level L2 is an example of the second level of the proficiency PL, and the message MS2 for intermediate level users is an example of the second message, which is shorter than the first message.

When the number of times the user US0 corresponding to the identification data UID has used the printing application within T1 days is equal to or more than TH1 times, the number of times N1 printing was performed by the user US0 is N1≥TH1 times. In this case, the voice UI determines that the proficiency PL of the user US0 is the advanced level L3, which is higher than the intermediate level L2, and generates a message MS3 for advanced level users, which is shorter than the message MS2 for intermediate level users (S212). That is, the number of times N1 for a case where the proficiency PL is the advanced level L3 is greater than that for a case where the proficiency PL is the intermediate level L2. FIG. 7 indicates that, as the message MS3 for advanced level users, a message telling "what would you like to print out?" is generated. For example, when T1 is seven and TH1 is three, because the number of times N1 the user US1 with the identification data UID1 shown in FIG. 3 has performed printing within seven days is six, which is greater than TH1 times, the message MS3 for advanced level users is generated. Note that, because the first level and the second level are relatively determined, when the intermediate level L2 corresponds to the first level, the advanced level L3 corresponds to the second level. In addition, because the first message and the second message are also relatively determined, when the message MS2 for intermediate level users corresponds to the first message, the message MS3 for advanced level users corresponds to the second message.

In the processing described above, a value of one indicating the beginner level L1, a value of two indicating the intermediate level L2, and a value of three indicating the advanced level L3 may be substituted into the proficiency PL as a variable.

In the processing in steps S202 to S206, the proficiency PL is determined based on the number of times N1 printing was performed by the user US0 within the predetermined period T1. In the processing in steps S208 to S212, the guidance message GM1 for acquiring the keyword KE0 is generated based on the proficiency PL. Therefore, for example, in a certain occasion where an object to be printed out is selected such as "calendars, scrapbooking . . . ", the same predetermined guidance message is not used but the message MS1 for beginners, which is a long message, is delivered to a beginner, the message MS2 for intermediate level users, which is a shorter message, is delivered to an intermediate level user, and the message MS3 for advanced level users, which is a further shorter message, is delivered to an advanced level user. In the present specific example, a different guidance message GM1 according to the proficiency level of a user US0 is provided even in the same certain occasion.

After the processing of step S208, S210, or S212, the voice UI transmits the guidance message GM1 to be output by voice to the voice mediation device 400 (S214) and terminates the processing for providing guidance by proficiency. After receiving the guidance message GM1, the voice mediation device 400 converts the guidance message GM1 into the voice signal SG1 and transmits the voice signal SG1 to the smart speaker 300 via the network NE1 (S114). After receiving the voice signal SG1, the smart speaker 300 converts the voice signal SG1 into voice and outputs the voice (S116). Consequently, the guidance message GM1 corresponding to his own proficiency level is read aloud by voice to the user US0. After listening to the voice, when the user US0 gives a print instruction PI by voice such as telling "print out xxx", the processing of S118 and the subsequent will be performed.

When the user US0 gives a print instruction PI by voice to the smart speaker 300, the smart speaker 300 converts the voice of the user US0 into a voice signal SG1 and transmits the voice signal SG1 to the voice mediation device 400 (S118). After receiving the voice signal SG1, the voice mediation device 400 analyzes the voice based on the voice signal SG1, identifies the user US0, and acquires the identification data UID corresponding to the identified user US0 (S120). Then, the voice mediation device 400 extracts the keyword KE0 from result of the voice analysis, provides the keyword KE0 and the identification data UID associated with the keyword KE0 to the voice UI, and requests processing to the voice UI (S122). When the result of the voice analysis includes a print request keyword, a print request including the identification data UID and the keyword KE0 as shown in FIG. 1 is transmitted to the voice UI from the voice mediation device 400. The keyword KE0 is a keyword included in a print instruction made by voice. The print instruction may contain a keyword that specifies a printer 200.

The voice UI acquires the keyword KE0 included in the voice instruction and the identification data UID associated with the keyword KE0 from the voice mediation device 400 (S124). The processing is branched by the voice UI according to whether or not the voice UI receives a print request from the voice mediation device 400 (S126). When the voice UI receives no print request, the processing is returned to step S112. Consequently, the guidance message GM1 corresponding to an occasion is generated and reported to the user US0. When the voice UI receives a print request, the voice UI transmits the print request including the keyword KE0 and the identification data UID to the cloud printing service. After receiving the print request, the cloud printing service generates print data DA1 using a content CO1 that is based on the keyword KE0 included in the print request (S128). When the corresponding content CO1 is present in the plurality of candidate contents CO2 stored in the content storage section 121 shown in FIGS. 1 and 2, the print data DA1 is generated by using the content CO1 selected from among the plurality of candidate contents CO2 based on the keyword KE0. When the corresponding content CO1 is present in a server computer connected to the network NE1, the print data DA1 is generated by using the content CO1 received from the server computer via the network NE1.

As described above, the keyword KE0 is acquired by the voice UI in response to an output of the guidance message GM1 and the print data DA1 is generated by using the content CO1 based on the keyword KE0.

After generating the print data DA1, the cloud printing service transmits the print data DA1 to the printer 200 via the network NE1 (S130). The printer 200 receives the print data DA1 via the network NE1 (S132). The printer 200 then executes printing according to the print data DA1 (S134). Consequently, the content CO1 corresponding to the utterance of the user US0 is printed out.

In addition, after transmitting the print data DA1, the cloud printing service reports the completion of printing of the corresponding content CO1 to the voice UI (S136). This report may be used to output a voice message from the smart speaker 300, telling "xxx is printed out" where XXX represents the name of the corresponding content CO1. After receiving the print completion report, the voice UI reports the completion of printing to the voice mediation device 400 (S138). After receiving the print completion report, the voice mediation device 400 generates a voice signal SG1 according to the report and transmits the voice signal SG1 to the smart speaker 300 (S140). After receiving the voice signal SG1, the smart speaker 300 converts the voice signal SG1 into voice and outputs the voice (S142). Consequently, the user US0 can hear the voice message telling that the content CO1 is printed out.

When the number of times N1 of printing performed within the predetermined period T1 is increased, the level of proficiency of the user US0 for the print instruction PI tends to be increased. In this specific example, because the guidance message GM1, which is generated based on the proficiency PL indicating the level of proficiency of the user US0 for the print instruction PI, is output to the user US0 by voice, annoyance such as listening to a long guidance message GM1, which is too long to an advanced level user who already knows the message, or listening to a short guidance message GM1, which is too short to a beginner to understand, is reduced. Therefore, in the print system SY1 of the present specific example, the annoyance is reduced and the user-friendliness is improved.

4. Modification Examples

Various modification examples are possible for the present disclosure.

The voice input/output device to which the present technology can be applied is not limited to a smart speaker but may be a terminal such as a smart phone or a tablet, a personal computer, or a similar device.

The above-described processing can be modified as appropriate, such as changing the order of steps. For example, in the processing for providing guidance by proficiency of FIG. 7, the determination process of step S204 and the determination process of step S206 are interchangeable. In this case, first in step S206, when N1<TH1 is false, the process may proceed to step S212 for executing the message generation process for advanced level users, and when N1<TH1 is true, the process may proceed to step S204 for executing the determination process. Then in step S204, when N1=0 is true, the process may proceed to step S208 for executing the message generation process for beginners, and when N1=0 is false, the process may proceed to step S210 for executing the message generation process for intermediate level users. In addition, steps S206 and S212 may be omitted from the processing for providing guidance by proficiency of FIG. 7, or steps S204 and S208 may be omitted from the processing for providing guidance by proficiency of FIG. 7.

The proficiency PL described above has three levels of proficiency, but the proficiency PL may have two levels or four or more levels.

In addition, in the above specific example, the information processor 100 stores the identification data UID for identifying the user US0 in the content storage section 121 and the cloud printing service manages the identification data UID for each user cooperatively with the voice mediation device 400, but the present disclosure is not limited to this user identification method. For example, instead of using the identification data UID, a mechanism such as OAuth2 that identifies a user by sending an access token, which is a character string for identifying a user, between the information processor 100 and the voice mediation device 400 may be used.

As shown in an example of FIG. 8, the number of times N1 of printing for determining the proficiency PL may be counted without specifying a period. FIG. 8 schematically shows a modification example of the processing for providing guidance by proficiency. In the processing shown in FIG. 8, step S202 of FIG. 7 is replaced by step S222.

When the processing for providing guidance by proficiency shown in FIG. 8 is started, the voice UI acquires number of times N1 in total that the user US0 corresponding to the identification data UID has used the printing application (S222). In step S222, the voice UI acquires the number of times N1 of printing performed by the user US0 indicated in the print history 600 shown in FIG. 3. For example, suppose that the print history 600 shown in FIG. 3 has print histories since 10 Mar. 2020. When the user US1 with the identification data UID1 speaks to the smart speaker 300, the voice UI acquires a value of seven as the number of times N1, which is the number of histories R1 associated with the identification data UID1. In addition, when the user US2 with the identification data UID2 speaks to the smart speaker 300, the voice UI acquires a value of two as the number of times N1, which is the number of histories associated with the identification data UID2.

Then, the voice UI determines the proficiency PL based on the number of times N1 (S204 to S206), and generates a guidance message GM1 that is used to acquire a keyword KE0 in step S124 of FIG. 6, based on the proficiency PL (S208 to S212). As described above, for the proficiency PL of the intermediate level L2, the number of times N1 is greater than the number of times N1 of a case where the proficiency PL is the beginner level L1. Likewise, for the proficiency PL of the advanced level L3, the number of times N1 is greater than the number of times N1 of a case where the proficiency PL is the intermediate level L2. Finally, the voice UI transmits the guidance message GM1 to be output by voice to the voice mediation device 400 (S214) and terminates the processing for providing guidance by proficiency.

As the number of times N1 the user US0 has performed printing increases, the user US0 tends to have higher proficiency. In an example shown in FIG. 8 also, because the guidance message GM1 to be output to the user US0 by voice is generated based on the proficiency PL, annoyance of the message to the user US0 is reduced and the user-friendliness is further improved.

Figure 9:
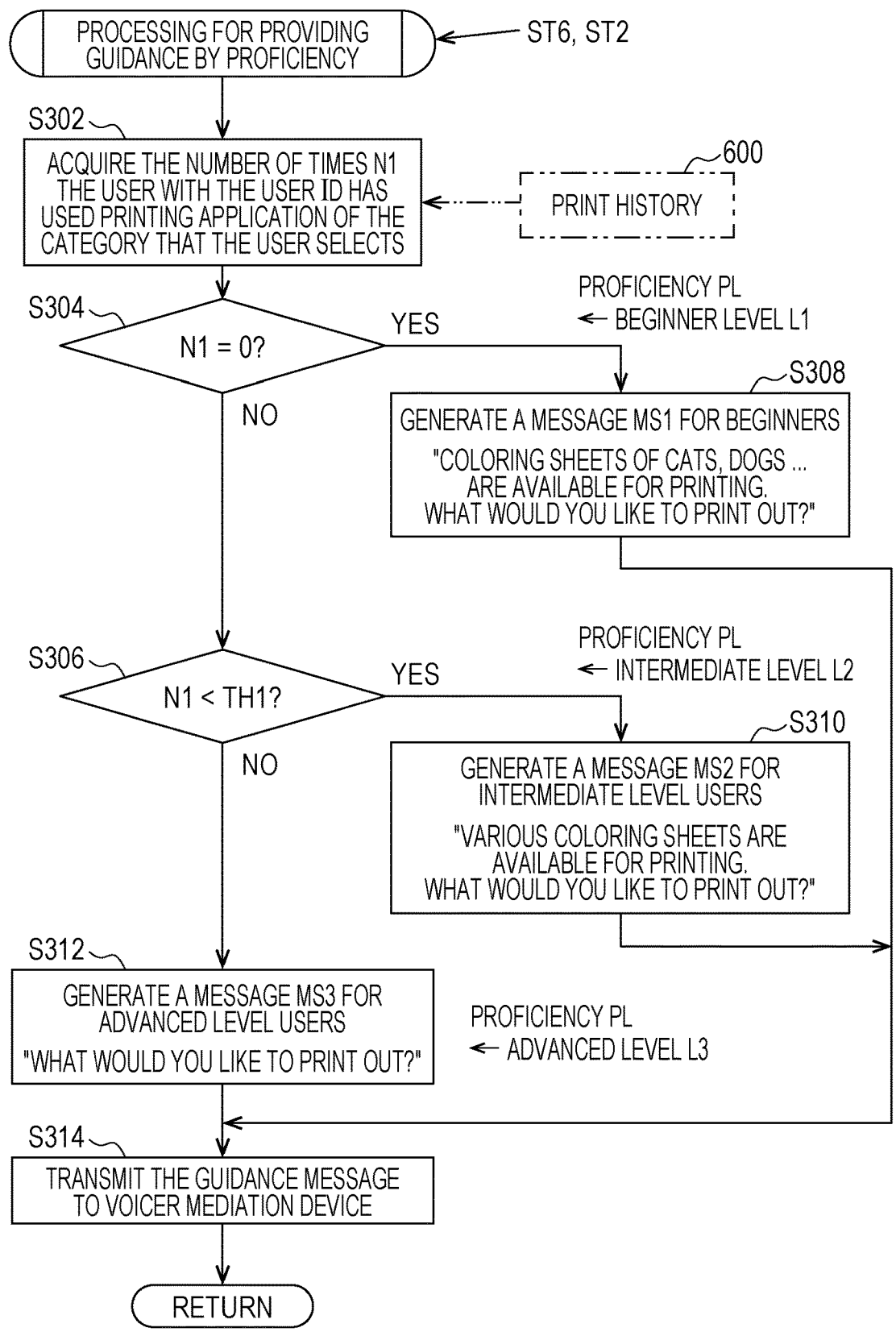
FIG. 9 is a flowchart schematically showing another modification example of the processing for providing guidance by proficiency.

As shown in FIG. 9, the number of times N1 of printing for determining the proficiency PL may be counted for each category. FIG. 9 schematically shows another modification example of the processing for providing guidance by proficiency. As a premise for executing this processing for providing guidance by proficiency, one of the categories including calendar, scrapbooking, coloring sheet, note, and so on is required to be selected by the user US0 according to the guidance message GM1. The flowchart of FIG. 9 shows examples of the guidance message GM1 when coloring sheet is selected as the category.

When the processing for providing guidance by proficiency shown in FIG. 9 is started, the voice UI acquires the number of times N1 printing application of the category selected by the user US0 with the identification data UID has been used (S302). In step S302, the voice UI acquires the number of times N1 of printing associated with the category information CA1, which indicates the category selected from the plurality of categories, based on the print history 600 shown in FIG. 3. For example, when the user US1 with the identification data UID1 speaks to the smart speaker 300, the voice UI acquires a value of five as the number of times N1, which is the number of histories in which the category information CA1 is coloring sheet among the histories R1 associated with the identification data UID1. In addition, when the user US2 with the identification data UID2 speaks to the smart speaker 300, the voice UI acquires a value of one as the number of times N1, which is the number of histories in which the category information CA1 is coloring sheet among histories associated with the identification data UID2.

After the number of times N1 is acquired, the processing is branched by the voice UI according to the number of times N1 (S304 to S306). The voice UI determines whether or not N1=0 is true in step S304 and determines whether or not N1<TH1 is true in step S306. When N1=0, the voice UI determines that the proficiency PL of the user US0 is the beginner level L1, and generates a message MS1 for beginners, which is a relatively long message (S308). FIG. 9 indicates that, as the message MS1 for beginners, a message telling "coloring sheets of cats, dogs . . . are available. What would you like to print out?" is generated. When 1≤N1<TH1, the voice UI determines that the proficiency PL of the user US0 is the intermediate level L2, and generates a message MS2 for intermediate level users (S310). FIG. 9 indicates that, as the message MS2 for intermediate level users, a message telling "various coloring sheets are available. What would you like to print out?" is generated. When N1≥TH1, the voice UI determines that the proficiency PL of the user US0 is the advanced level L3, and generates a message MS3 for advanced level users (S312). FIG. 9 indicates that, as the message MS3 for advanced level users, a message telling "what would you like to print out?" is generated. Finally, the voice UI transmits the guidance message GM1 to be output by voice to the voice mediation device 400 (S314), and terminates the processing for providing guidance by proficiency.

In an example shown in FIG. 9, because the guidance message GM1 corresponding to the proficiency level of the user US0 is output to the user US0 by voice for each category of the content CO1, annoyance to the user US0 such as listening to a long guidance message GM1, which is too long to an advanced level user in one category, or listening to a short guidance message GM1, which is too short to a beginner in another category, is reduced. Therefore, in the example shown in FIG. 9, the annoyance to the user US0 is reduced and the user-friendliness is further improved.

The plurality of candidate contents CO2 shown in FIGS. 1 and 2 will be updated, as needed. For this reason, it is helpful for the user US0 to be able to know that a candidate content CO2 is updated. Meanwhile, when the user US0 has already known the update of the candidate content CO2, the user US0 may be annoyed by the report of the update of the candidate content CO2. For beginners, informing of the update of the candidate content CO2 has no meaning. Thus, it is appropriate to inform of the update of the candidate content CO2 only to the users US0 who needs that information.

FIG. 10 schematically shows still another modification example of the processing for providing guidance by proficiency in which update of the candidate content CO2 is informed in an appropriate occasion. In the processing shown in FIG. 10, processes of steps S322 to S328 are added to the processing shown in FIG. 9. In FIG. 10, steps S306, S310, and S312 shown in FIG. 9 are not shown. As premises for executing this processing for providing guidance by proficiency shown in FIG. 10, coloring sheets of "cat" and "dog" as candidate contents are added lately to the category of coloring sheet, and the category of coloring sheet is selected by the user US0 in response to the guidance message GM1. The flowchart of FIG. 10 shows examples of the guidance message GM1 when coloring sheet is selected as the category.

When the processing for providing guidance by proficiency shown in FIG. 10 is started, the voice UI acquires the number of times N1 printing application of the category selected by the user US0 corresponding to the identification data UID has been used (S302). In step S302, the voice UI acquires the number of times N1 of printing associated with the category information CA1, which indicates the category selected from the plurality of categories, based on the print history 600 shown in FIG. 3. After the number of times N1 is acquired, the processing is branched by the voice UI according to whether or not N1=0 (S304). When N1=0, the voice UI determines that the proficiency PL of the user US0 is the beginner level L1, and generates a message MS1 for beginners, which is a relatively long message (S308). In the message MS1 for beginners, a message indicating the update of the candidate contents CO2 is not included.

When N1=0 is false, the processing is branched by the voice UI according to whether or not printing has been performed for the category selected by the user US0 after the candidate contents CO2 were changed (S322). In step S322, the voice UI may determine whether or not the user US0 has performed printing for the category selected by the user US0 after the candidate contents CO2 were updated, based on the print history 600. When printing has been performed after the candidate contents CO2 were changed, the voice UI moves the processing to step S306 shown in FIG. 9. In this case, the message MS2 for intermediate level users or the message MS3 for advanced level users is generated. In these messages MS2 and MS3, a message indicating the update of the candidate contents CO2 is not included.

When printing has not been performed after the candidate contents CO2 were changed, the processing is branched by the voice UI according to whether or not N1<TH1 is true (S324). When N1<TH1, the voice UI determines that the proficiency PL of the user US0 is the intermediate level L2, and generates a message MS2 for intermediate level users (S326). FIG. 10 indicates that, as the message MS2 for intermediate level users, a message telling "new coloring sheets of cats and dogs are available. What would you like to print out?" is generated. The term "new coloring sheets of cats and dogs are available" included in the message MS2 for intermediate level users is an example indicating that a plurality of candidate contents CO2 was changed. When N1≥TH1, the voice UI determines that the proficiency PL of the user US0 is the advanced level L3, and generates a message MS3 for advanced level users (S328). FIG. 10 indicates that, as the message MS3 for advanced level users, a message telling "new cats and dogs are available. What would you like to print out?" is generated. The term "new cats and dogs are available" included in the message MS3 for advanced level users is an example indicating that a plurality of candidate contents CO2 was changed. Finally, the voice UI transmits the guidance message GM1 to be output by voice to the voice mediation device 400 (S314), and terminates the processing for providing guidance by proficiency.

In the example shown in FIG. 10, when the user US0 requests printing by voice, the user US0 can be informed that candidate contents CO2 have been changed since the last time the user US0 gave a print instruction. Consequently, the user-friendliness is further improved.

Note that when a plurality of candidate contents CO2 was changed, the change may be reported to the user US0 via the voice mediation device 400 separately from the guidance message GM1. Furthermore, regardless of the category selected by the user US0, when a plurality of candidate contents CO2 was changed and a history R0 of printing by the user US0 is included in the print history 600, the change of the plurality of candidate contents CO2 may be reported to the user US0 via the voice mediation device 400.

In the meantime, the speed of becoming proficient may be fast or slow depending on a user US0. Thus, even when the print system SY1 determines that the user US0 is a beginner, the user US0 who is quick at becoming proficient may feel annoyed to listening to a long message MS1 for beginners. In addition, even when the print system SY1 determines that the user US0 is an intermediate level user, the user US0 who is not quick at becoming proficient may feel annoyed to listening to a short message MS2 for intermediate level users, which is too short for the user US to understand. For this reason, it is helpful for the user US0 to be able to specify the level of proficiency PL.

FIG. 11 schematically shows an example of branch processing to be executed in place of step S126 shown in FIG. 6. Steps S402 to S404 correspond to the proficiency determination step ST6, the proficiency determination section 113, and the proficiency determination function FU4.

When the keyword KE0 and the identification data UID are acquired n step S124 shown in FIG. 6, the branch processing shown in FIG. 11 is started. First, the processing is branched by the voice UI according to whether or not the voice UI receives a print request from the voice mediation device 400 (S126). When the voice UI receives the print request, the voice UI transmits the print request to the cloud printing service. After receiving the print request, the cloud printing service generates print data DA1 (S128 of FIG. 6). When the voice UI receives no print request, the processing is branched according to whether or not a keyword KE1 of a proficiency instruction, which specifies the proficiency PL by voice, is acquired from the voice mediation device 400 (S402). When the voice UI acquires no proficiency instruction keyword KE1, the processing is returned to step S112.

When the voice UI acquires the proficiency instruction keyword KE1, the voice UI executes processing according to the type of the proficiency instruction keyword KE1 (S404), and returns the processing to step S112 of FIG. 6.

For example, when the proficiency instruction keyword KE1 is "shorten a message", the voice UI executes processing for increasing the proficiency PL, which is a variable, by one. For example, when the proficiency PL is one, that is the beginner level L1, the voice UI increases the proficiency PL to two, that is the intermediate level L2. When the proficiency PL is two, the voice UI increases the proficiency PL to three, that is the advanced level L3. Note that when the proficiency PL is three already, the voice UI keeps the proficiency PL to three as it is.

In addition, when the proficiency instruction keyword KE1 is "make a message longer", the voice UI executes processing for decreasing the proficiency PL by one. For example, when the proficiency PL is three, that is the advanced level L3, the voice UI decreases the proficiency PL to two, that is the intermediate level L2. When the proficiency PL is two, the voice UI decreases the proficiency PL to one, that is the beginner level L1. Note that when the proficiency PL is one already, the voice UI keeps the proficiency PL to one as it is.

Furthermore, when the proficiency instruction keyword KE1 is "I am a beginner", the voice UI executes processing for setting the proficiency PL to one. Although not shown in the drawings, the proficiency instruction keyword KE1 may include "I am an intermediate level user", "I am an advanced level user", and so on.

With the processing described above, the user US0 can specify the own level of proficiency by voice. Consequently, in the example shown in FIG. 11, the annoyance to the user US0 can be further reduced.

In addition, as shown in an example of FIG. 12, the proficiency PL may be determined based on the response keyword KE2 in response to the inquiry message IM1, which asks the user US0 whether to change the proficiency PL. FIG. 12 shows an example of inquiry processing for changing proficiency, which is performed after the processing for reporting the completion of printing in step S136 of FIG. 6. This inquiry processing corresponds to the proficiency determination step ST6, the proficiency determination section 113, and the proficiency determination function FU4.

When the inquiry processing for changing proficiency shown in FIG. 12 is started, the voice UI transmits an inquiry message IM1 asking whether to change the proficiency PL to the voice mediation device 400, and causes the voice mediation device 400 to output the inquiry message IM1 by voice (S502). The inquiry message IM1 includes terms like "would you like to simplify a message next time?", "would you like to shorten a message next time?" and so on. After receiving the inquiry message IM1, the voice mediation device 400 converts the inquiry message IM1 into a voice signal SG1, and transmits the voice signal SG1 to the smart speaker 300 via the network NE1. After receiving the voice signal, the smart speaker 300 converts the voice signal SG1 into voice, and output the voice. Consequently, the inquiry message IM1 is read aloud by voice to the user US0.

After transmitting the inquiry message IM1, the processing is branched by the voice UI according to whether or not the voice UI acquires a response keyword KE2, in which a response to the inquiry message IM1 is instructed, from the voice mediation device 400 (S504). The response keyword KE2 includes "yes", "please", and so on. When a response keyword KE2 is not included in the keyword KE0, the voice UI terminates the inquiry processing for changing proficiency without executing the process of S506.

When a response keyword KE2 is included in the keyword KE0, the voice UI determines the proficiency PL based on the response keyword KE2 (S506). For example, the voice UI executes processing for increasing the proficiency PL, which is a variable, by one. As a result, when the proficiency PL at the time of transmitting the inquiry message IM1 is one, that is the beginner level L1, the voice UI increases the proficiency PL to two, that is the intermediate level L2. When the proficiency PL is two, the voice UI increase the proficiency PL to three, that is the advanced level L3. Then, the voice UI terminates the inquiry processing for changing proficiency.

Note that the response keyword KE2 may be a request like "make a message longer" to lower the proficiency PL. In this case, the voice UI may execute processing for decreasing the proficiency PL by one.

With the processing describe above, the user US0 can increase the proficiency PL by asking by voice to increase the proficiency PL in response to the inquiry message IM1. As a result, from the next time, the user US0 can give a print instruction by voice according to a relatively short guidance message GM1 based on the increased proficiency PL. In addition, the user US0 can lower the proficiency PL by asking by voice to decrease the proficiency PL in response to the inquiry message IM1. Consequently, in the example shown in FIG. 12, the annoyance to the user US0 can be further reduced.

5. Conclusion

As described above, according to the present disclosure, in various embodiments, it is possible to provide technology that makes it possible to improve the user-friendliness of the print system. Of course, even with technology consisting only of the constituent elements of the independent claims, the basic operation and effects described above can be obtained.

Also, it is also possible to implement a constitution in which each component disclosed in the examples described above are mutually exchanged, or the combination is changed, or a constitution in which each component of known technology as well as that disclosed in the examples described above are mutually replaced or the combination is changed. The present disclosure also includes these and similar constitutions.

What is claimed is:

1. A print system comprising:
   a print device; and
   an information processor being connected to the print device via a network, wherein
   the information processor includes
      an information acquisition section that acquires, from a voice mediation device, information including a keyword included in a print instruction given by a user by voice,
      a guidance section that transmits, to the voice mediation device, a guidance message to be output by voice,
      a print data transmission section that generates print data using content based on the keyword acquired by the information acquisition section in response to an output of the guidance message and transmits the generated print data to the print device, and
      a proficiency determination section that determines proficiency indicating a level of proficiency of the user for the print instruction based upon a print history stored in a print history storage,
   the guidance section generates, based on the proficiency, the guidance message that is used for the acquisition of the keyword by the information acquisition section, and
   the print device receives the generated print data and executes printing according to the generated print data.

2. The print system according to claim 1, wherein the guidance section generates, as the guidance message, a first message when the proficiency is a first level and a second message that is shorter than the first message when the proficiency is a second level that is higher than the first level.

3. The print system according to claim 1, wherein the information processor further includes the history storage section that stores the print history indicating a history of the printing executed by the print device, and the proficiency determination section determines the proficiency based on the print history stored in the history storage section.

4. The print system according to claim 3, wherein the proficiency determination section acquires a number of times the user performed the printing within a predetermined period from the print history and determines the proficiency based on the number of times, and the number of times for the second level proficiency, which is higher than the first level proficiency, is greater than the number of times for the first level proficiency.

5. The print system according to claim 4, wherein the history storage section stores the print history in a state where category information that indicates a category selected from among a plurality of categories classifying a plurality of candidate contents and the history of the printing are associated with each other, and the proficiency determination section acquires number of times of the printing associated with the category information indicating the category selected from among the plurality of categories and determines the proficiency based on the number of times.

6. The print system according to claim 5, wherein the guidance section causes the voice mediation device to output by voice a message informing that the plurality of candidate contents was changed when the plurality of candidate contents was changed and the print history includes a history of the printing performed by the user.

7. The print system according to claim 3, wherein the proficiency determination section acquires the number of times the user performed the printing from the print history and determines the proficiency based on the number of times, and the number of times for the second level proficiency, which is higher than the first level proficiency, is greater than the number of times for the first level proficiency.

8. The print system according to claim 4, wherein the history storage section stores the print history in a state where identification data of the user and a history of the printing are associated with each other, the information acquisition section acquires the identification data associated with the keyword from the voice mediation device, and the proficiency determination section acquires the number of times of the printing associated with the acquired identification data from the print history and determines the proficiency of the user based on the number of times.

9. The print system according to claim 1, wherein the proficiency determination section acquires a proficiency instruction keyword that specifies the proficiency by voice from the voice mediation device and determines the proficiency based on the proficiency instruction keyword.

10. The print system according to claim 1, wherein the proficiency determination section causes the voice mediation device to output by voice an inquiry message asking whether to change the proficiency, acquires a response keyword, in which a response to the inquiry message is instructed, from the voice mediation device, and determines the proficiency based on the response keyword.

11. A print method using a print device and an information processor connected to the print device via a network, comprising:
  an information acquisition step of acquiring, in the information processor, information including a keyword included in a print instruction given by a user by voice from a voice mediation device;
  a guidance step of transmitting a guidance message to be output by voice, from the information processor to the voice mediation device;
  a print data generation step of generating, in the information processor, print data using content based on the keyword acquired in the information acquisition step in response to an output of the guidance message;
  a print data transmission step of transmitting the generated print data from the information processor to the print device;
  a printing step of executing printing in the print device according to the transmitted print data; and
  a proficiency determination step of determining, in the information processor, proficiency indicating a level of proficiency of the user for the print instruction based upon a print history stored in a print history storage, wherein
  the guidance message that is used for the acquisition of the keyword in the information acquisition step is generated based on the proficiency in the guidance step.

12. An information processor being connected to a print device that executes printing according to print data, via a network, comprising:
  an information acquisition section that acquires, from a voice mediation device, information including a keyword included in a print instruction given by a user by voice;
  a guidance section that transmits, to the voice mediation device, a guidance message to be output by voice;
  a print data transmission section that generates print data using content based on the keyword acquired by the information acquisition section in response to an output of the guidance message and transmits the generated print data to the print device; and
  a proficiency determination section that determines proficiency indicating a level of proficiency of the user for the print instruction based upon a print history stored in a print history storage, wherein
  the guidance section generates, based on the proficiency, the guidance message that is used for the acquisition of the keyword by the information acquisition section.

13. A non-transitory computer-readable storage medium storing an information processing program for an information processor connected, via a network, to a print device that executes printing according to print data, the program causing a computer to implement:
  an information acquisition function that acquires, from a voice mediation device, information including a keyword included in a print instruction given by a user by voice;
  a guidance function that transmits, to the voice mediation device, a guidance message to be output by voice;
  a print data transmission function that generates print data using content based on the keyword acquired by the information acquisition function in response to an output of the guidance message and transmits the generated print data to the print device; and
  a proficiency determination function that determines proficiency indicating a level of proficiency of the user for the print instruction based upon a print history stored in a print history storage, wherein
  the guidance function generates, based on the proficiency, the guidance message that is used for the acquisition of the keyword by the information acquisition function.

* * * * *